(12) United States Patent  (10) Patent No.: US 9,188,792 B2
Calilung et al.  (45) Date of Patent: Nov. 17, 2015

(54) MOUNTING MECHANISM FOR EYEWEAR

(71) Applicant: Oakley, Inc., Foothill Ranch, CA (US)

(72) Inventors: Ryan Calilung, Irvine, CA (US);
Jeremy Hadden, Dana Point, CA (US)

(73) Assignee: Oakley, Inc., Foothill Ranch, CA (US)

( * ) Notice: Subject to any disclaimer, the term of this patent is extended or adjusted under 35 U.S.C. 154(b) by 113 days.

(21) Appl. No.: 13/624,587

(22) Filed: Sep. 21, 2012

(65) Prior Publication Data

US 2013/0077042 A1  Mar. 28, 2013

Related U.S. Application Data

(60) Provisional application No. 61/538,068, filed on Sep. 22, 2011.

(51) Int. Cl.
 *G02C 5/14* (2006.01)
 *G02C 1/02* (2006.01)
 *G02C 5/10* (2006.01)

(52) U.S. Cl.
 CPC ... *G02C 1/02* (2013.01); *G02C 5/10* (2013.01)

(58) Field of Classification Search
 USPC .................................. 351/116, 111
 See application file for complete search history.

(56) References Cited

U.S. PATENT DOCUMENTS

| 245,268 | A | 8/1881 | Andross |
| 1,308,477 | A | 7/1919 | Blanchard |
| 1,588,775 | A | 6/1926 | Schumacher |
| 1,839,386 | A | 1/1932 | Fischer |
| 2,391,361 | A | 12/1945 | Stevenson |
| 2,504,157 | A | 4/1950 | Rosenheim |
| 2,652,746 | A | 12/1950 | Shanks |
| 2,610,323 | A | 9/1952 | Johnson |
| 3,214,767 | A | 11/1965 | Weber |
| 3,229,303 | A | 1/1966 | Jonassen |
| 3,395,964 | A | 8/1968 | Chartrice |
| 3,552,840 | A | 1/1971 | Braget |
| 3,691,565 | A | 9/1972 | Galonek |
| 3,826,564 | A | 7/1974 | Werling, Sr. |
| 3,901,589 | A | 8/1975 | Bienenfeld |
| 3,931,646 | A | 1/1976 | Loughner |
| 4,023,214 | A | 5/1977 | Waldherr |

(Continued)

FOREIGN PATENT DOCUMENTS

| EP | 0121 018 | 10/1984 |
| EP | 0496 292 | 1/1991 |

(Continued)

OTHER PUBLICATIONS

International Search Report and Written Opinion in International Application No. PCT/US2012/056727, dated Dec. 10, 2012 in 13 pages.

*Primary Examiner* — Jack Dinh

(74) *Attorney, Agent, or Firm* — Knobbe Martens Olson & Bear, LLP

(57) ABSTRACT

Eyewear can be provided that comprises at least one lens, at least one earstem, and a retention assembly that interconnects the lens with the earstem. The retention assembly can include an engagement protrusion attached to the lens and a coupling mechanism attached to an end of the earstem. The coupling mechanism can include a housing configured to receive the engagement protrusion and a lever mechanism being operative to move between open and closed positions for disengaging or engaging with the engagement protrusion.

16 Claims, 25 Drawing Sheets

(56) References Cited

U.S. PATENT DOCUMENTS

| | | |
|---|---|---|
| 4,056,853 A | 11/1977 | Bottazzini et al. |
| 4,153,347 A | 5/1979 | Myer |
| 4,176,921 A | 12/1979 | Matthias |
| 4,264,987 A | 5/1981 | Runckel |
| 4,304,469 A | 12/1981 | Solomon |
| 4,314,814 A | 2/1982 | Deroode |
| 4,340,282 A | 7/1982 | Murakami |
| 4,357,080 A | 11/1982 | Solomon |
| 4,471,496 A | 9/1984 | Gardner, Jr. et al. |
| 4,515,448 A | 5/1985 | Tackles |
| 4,662,966 A | 5/1987 | Sumi et al. |
| 4,670,084 A | 6/1987 | Durand |
| 4,686,712 A | 8/1987 | Spiva |
| 4,730,915 A | 3/1988 | Jannard |
| 4,759,622 A | 7/1988 | Schmidthaler |
| 4,813,775 A | 3/1989 | Kaksonen |
| 4,822,158 A | 4/1989 | Porsche |
| 4,859,048 A | 8/1989 | Jannard |
| 4,867,550 A | 9/1989 | Jannard |
| 4,983,030 A | 1/1991 | Chandler |
| 5,016,293 A | 5/1991 | Lickle |
| 5,048,944 A | 9/1991 | Porsche |
| 5,069,541 A | 12/1991 | Holmes et al. |
| 5,182,586 A | 1/1993 | Bennato |
| 5,182,587 A | 1/1993 | Hyoi |
| 5,208,614 A | 5/1993 | Jannard |
| 5,257,050 A | 10/1993 | Wiedner |
| 5,270,743 A | 12/1993 | Hofmair et al. |
| 5,308,426 A | 5/1994 | Claveau |
| 5,357,292 A | 10/1994 | Wiedner |
| 5,359,370 A | 10/1994 | Mugnier |
| 5,373,331 A | 12/1994 | Vallalla et al. |
| 5,387,949 A | 2/1995 | Tackles |
| 5,390,369 A | 2/1995 | Tubin |
| 5,400,089 A | 3/1995 | Danloup et al. |
| 5,410,763 A | 5/1995 | Bolle |
| 5,418,580 A | 5/1995 | Sondrol |
| 5,418,581 A | 5/1995 | Conway |
| 5,455,639 A | 10/1995 | Magdelaine et al. |
| 5,536,828 A | 7/1996 | Deluca et al. |
| 5,541,674 A | 7/1996 | Jannard |
| 5,576,775 A | 11/1996 | Bolle |
| 5,583,583 A | 12/1996 | Wilson |
| 5,587,747 A | 12/1996 | Bernheiser |
| 5,602,603 A | 2/1997 | Bondet |
| 5,617,588 A | 4/1997 | Canavan et al. |
| 5,641,372 A | 6/1997 | Okuno |
| 5,648,832 A | 7/1997 | Houston et al. |
| 5,689,323 A | 11/1997 | Houston et al. |
| 5,708,489 A | 1/1998 | Jannard |
| 5,760,866 A | 6/1998 | Wedeck et al. |
| 5,790,230 A | 8/1998 | Sved |
| 5,798,017 A | 8/1998 | Claveau |
| 5,805,261 A | 9/1998 | Houston et al. |
| 5,815,235 A | 9/1998 | Runckel |
| 5,862,529 A | 1/1999 | Moodie |
| 5,898,469 A | 4/1999 | Wang |
| 5,914,767 A | 6/1999 | Wedeck et al. |
| 5,929,963 A | 7/1999 | McNeal |
| 5,963,293 A | 10/1999 | Jannard |
| 5,969,789 A | 10/1999 | Houston et al. |
| 5,971,536 A | 10/1999 | Chiu |
| 5,987,702 A | 11/1999 | Simioni |
| 6,007,199 A | 12/1999 | Yang |
| 6,009,564 A | 1/2000 | Tackles et al. |
| 6,010,217 A | 1/2000 | Houston et al. |
| 6,047,410 A | 4/2000 | Dondero |
| 6,062,688 A | 5/2000 | Vinas |
| 6,086,199 A | 7/2000 | Holland et al. |
| 6,094,751 A | 8/2000 | Parks |
| 6,098,204 A | 8/2000 | Arnette |
| 6,105,177 A | 8/2000 | Paulson et al. |
| 6,106,116 A | 8/2000 | Houston et al. |
| 6,119,279 A | 9/2000 | Haslbeck |
| 6,131,246 A | 10/2000 | Paulson et al. |
| 6,168,271 B1 | 1/2001 | Houston et al. |
| 6,193,367 B1 | 2/2001 | Lee |
| 6,224,209 B1 | 5/2001 | Chen |
| 6,231,181 B1 | 5/2001 | Swab |
| 6,250,756 B1 | 6/2001 | Jannard |
| 6,273,564 B1 | 8/2001 | Wedeck et al. |
| 6,282,727 B1 | 9/2001 | Lindahl |
| 6,296,357 B1 | 10/2001 | Bof |
| 6,428,165 B1 | 8/2002 | Rivera |
| 6,464,353 B1 | 10/2002 | Spindelbalker |
| 6,477,717 B1 | 11/2002 | Winefordner et al. |
| 6,533,412 B1 | 3/2003 | Wang et al. |
| 6,540,351 B1 | 4/2003 | Meiler |
| 6,550,912 B2 | 4/2003 | Vitaloni |
| 6,561,647 B1 | 5/2003 | Chen |
| 6,564,804 B2 | 5/2003 | Salatka et al. |
| 6,575,570 B2 | 6/2003 | Mauri |
| 6,641,263 B2 | 11/2003 | Olney |
| 6,712,465 B1 | 3/2004 | Teng |
| 6,715,157 B2 | 4/2004 | Mage |
| 6,732,383 B2 | 5/2004 | Cleary et al. |
| 6,742,890 B1 | 6/2004 | Teng |
| 6,742,891 B2 | 6/2004 | Chen |
| 6,786,592 B2 | 9/2004 | Rivera |
| 6,804,835 B2 | 10/2004 | Chou |
| 6,834,951 B2 | 12/2004 | Xie |
| 6,857,738 B1 | 2/2005 | Bove et al. |
| 6,863,395 B1 | 3/2005 | Teng |
| 6,923,537 B2 | 8/2005 | Hartley et al. |
| 6,926,404 B2 | 8/2005 | Bassahon et al. |
| 6,929,364 B1 | 8/2005 | Jannard |
| 6,938,277 B2 | 9/2005 | Lindahl |
| 6,942,338 B2 | 9/2005 | Ku |
| 6,953,247 B1 | 10/2005 | Duffy et al. |
| 6,959,988 B1 | 11/2005 | Sheldon |
| 6,964,067 B1 | 11/2005 | Hartman |
| 6,964,477 B1 | 11/2005 | Teng |
| 6,994,434 B2 | 2/2006 | Blanchette et al. |
| 7,000,263 B2 | 2/2006 | McNeal |
| 7,058,991 B2 | 6/2006 | Hartman |
| 7,083,276 B2 | 8/2006 | Olney |
| 7,090,346 B2 | 8/2006 | Tsai |
| 7,137,426 B2 | 11/2006 | Neri et al. |
| 7,137,700 B2 | 11/2006 | DiChiara et al. |
| 7,150,525 B1 | 12/2006 | Yang |
| 7,163,289 B2 | 1/2007 | Wedeck et al. |
| 7,200,875 B2 | 4/2007 | Dondero |
| 7,204,589 B2 | 4/2007 | Pieterman |
| 7,219,992 B1 | 5/2007 | Wu |
| 7,219,993 B1 | 5/2007 | Chiou |
| 7,222,958 B1 | 5/2007 | Chiou |
| 7,222,959 B2 | 5/2007 | Jannard |
| 7,234,808 B2 | 6/2007 | Bruck |
| 7,241,007 B2 | 7/2007 | Cody |
| 7,261,410 B1 | 8/2007 | Chen |
| 7,267,737 B2 | 9/2007 | Neri et al. |
| 7,278,733 B2 | 10/2007 | Olney |
| 7,296,887 B1 | 11/2007 | Hsiung |
| 7,328,999 B2 | 2/2008 | Zelman |
| 7,347,545 B1 | 3/2008 | Jannard et al. |
| 7,390,086 B2 | 6/2008 | Lee |
| 7,396,124 B2 | 7/2008 | Wang |
| 7,425,065 B2 | 9/2008 | Wang |
| 7,452,069 B2 | 11/2008 | Lipawsky |
| 7,481,529 B1 | 1/2009 | Chen |
| 7,497,569 B2 | 3/2009 | Webb |
| 7,520,217 B2 | 4/2009 | Roberts et al. |
| 7,526,813 B2 | 5/2009 | Tominaga et al. |
| 7,553,013 B2 | 6/2009 | Tsai |
| 7,563,341 B2 | 7/2009 | Ferguson et al. |
| 7,585,072 B1 | 9/2009 | Wang-Lee |
| 7,594,280 B2 | 9/2009 | Lindahl |
| 7,648,233 B2 | 1/2010 | Blanshay et al. |
| 7,658,492 B2 | 2/2010 | Siu |
| 7,681,257 B1 | 3/2010 | Broersma |
| 7,686,449 B2 | 3/2010 | Jannard et al. |
| 7,703,913 B2 | 4/2010 | Huang |
| 7,712,894 B2 | 5/2010 | Tsai |
| 7,712,896 B1 | 5/2010 | Lee |

(56) References Cited

U.S. PATENT DOCUMENTS

| | | |
|---|---|---|
| 7,725,959 B2 | 6/2010 | Wang-Lee |
| 7,771,043 B2 | 8/2010 | Welchel et al. |
| 7,810,174 B2 | 10/2010 | Matera |
| 7,850,301 B2 | 12/2010 | DiChiara |
| 7,856,673 B2 | 12/2010 | Reed |
| 7,887,181 B1 | 2/2011 | Chen |
| 7,954,942 B2 | 6/2011 | Calilung et al. |
| 8,192,015 B2 | 6/2012 | Taylor et al. |
| 2002/0039928 A1 | 4/2002 | Spurgeon et al. |
| 2004/0141147 A1 | 7/2004 | Cyr |
| 2004/0160570 A1 | 8/2004 | Polovin |
| 2005/0070434 A1 | 3/2005 | Drake |
| 2005/0132478 A1 | 6/2005 | Canavan |
| 2005/0270477 A1 | 12/2005 | Curci et al. |
| 2006/0119790 A1 | 6/2006 | Tsai |
| 2006/0179554 A1 | 8/2006 | Barton |
| 2006/0191062 A1 | 8/2006 | Matera |
| 2006/0250571 A1 | 11/2006 | Li |
| 2006/0256281 A1 | 11/2006 | Li |
| 2006/0283555 A1 | 12/2006 | Green |
| 2007/0024806 A1 | 2/2007 | Blanshay |
| 2007/0109490 A1 | 5/2007 | Collier et al. |
| 2007/0121059 A1 | 5/2007 | Chiou |
| 2007/0200997 A1 | 8/2007 | Jannard |
| 2007/0240812 A1 | 10/2007 | Bortolato |
| 2007/0261782 A1 | 11/2007 | Frye et al. |
| 2008/0036961 A1 | 2/2008 | Zhou |
| 2008/0072365 A1 | 3/2008 | Alberto |
| 2008/0137028 A1 | 6/2008 | Webb |
| 2008/0155736 A1 | 7/2008 | Paulson et al. |
| 2008/0198323 A1 | 8/2008 | Siu |
| 2008/0266515 A1 | 10/2008 | Hou |
| 2008/0301858 A1 | 12/2008 | Wang-Lee |
| 2008/0304005 A1 | 12/2008 | DiChiara |
| 2009/0015784 A1 | 1/2009 | Van Atta |
| 2009/0019620 A1 | 1/2009 | Reed |
| 2009/0038059 A1 | 2/2009 | McNeal et al. |
| 2009/0217444 A1 | 9/2009 | Pan |
| 2009/0225271 A1 | 9/2009 | Radmard et al. |
| 2009/0300830 A1 | 12/2009 | Mage |
| 2009/0313746 A1 | 12/2009 | Wang |
| 2009/0323015 A1 | 12/2009 | Siu |
| 2010/0085533 A1 | 4/2010 | Calilung et al. |
| 2010/0201937 A1 | 8/2010 | Gardaz |
| 2010/0231850 A1 | 9/2010 | Hones |
| 2011/0007262 A1 | 1/2011 | Taylor et al. |
| 2011/0194065 A1 | 8/2011 | Belbey et al. |
| 2011/0225709 A1 | 9/2011 | Saylor et al. |
| 2011/0225710 A1 | 9/2011 | Reyes et al. |
| 2011/0225711 A1 | 9/2011 | Reyes et al. |
| 2011/0242479 A1 | 10/2011 | Radmard et al. |
| 2011/0299026 A1 | 12/2011 | Calilung et al. |
| 2012/0038879 A1 | 2/2012 | Reyes et al. |
| 2012/0218504 A1 | 8/2012 | Taylor et al. |

FOREIGN PATENT DOCUMENTS

| | | |
|---|---|---|
| EP | 1810648 | 7/2007 |
| EP | 1830221 | 9/2007 |
| EP | 2 042 910 A1 | 4/2009 |
| EP | 2 090 921 A1 | 8/2009 |
| FR | 1126329 | 11/1956 |
| FR | 2088866 | 1/1972 |
| FR | 2626683 | 8/1989 |
| FR | 2688322 | 12/1992 |
| FR | 2 800 173 | 4/2001 |
| GB | 512419 | 9/1939 |
| GB | 2199155 | 6/1988 |
| GB | 2278459 | 11/1994 |
| JP | 219021 | 2/1990 |
| JP | 07-64028 | 3/1995 |
| JP | 07-140423 | 6/1995 |
| JP | 2009-139921 | 6/2009 |
| JP | 2010-224130 | 10/2010 |
| WO | WO 98/30930 | 7/1998 |
| WO | WO 03/023495 | 3/2003 |
| WO | WO 2007/049070 | 5/2007 |
| WO | WO 2010/021419 | 2/2010 |
| WO | WO 2010/081043 | 7/2010 |

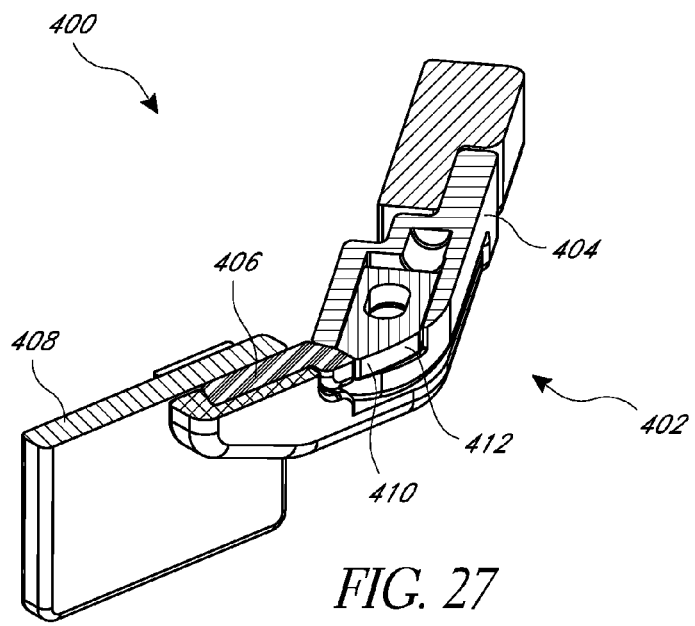
FIG. 27
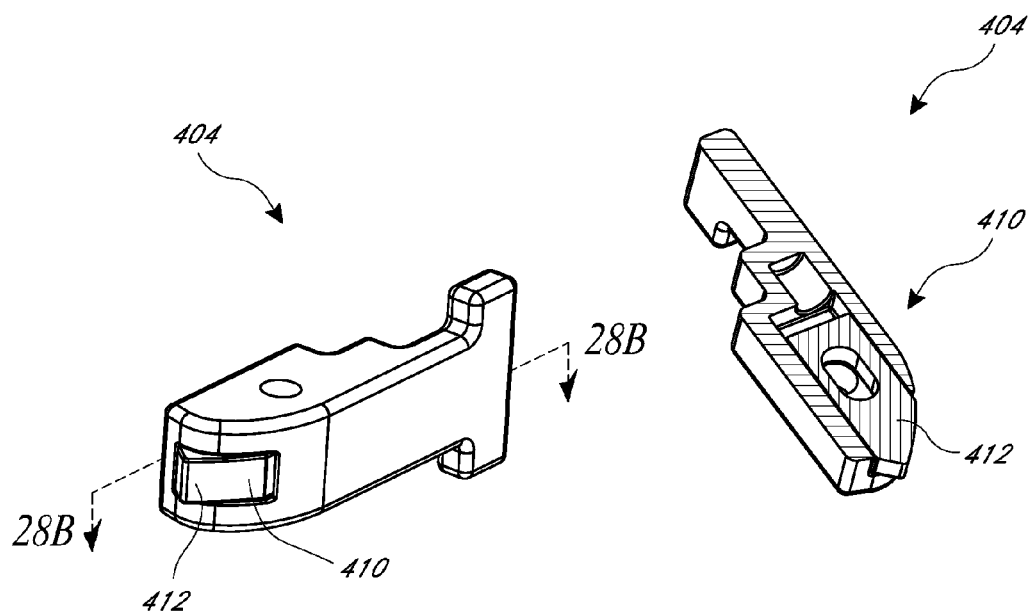
FIG. 28A
FIG. 28B

MOUNTING MECHANISM FOR EYEWEAR

RELATED APPLICATIONS

This application claims the benefit of U.S. Provisional Application No. 61/538,068, filed on Sep. 22, 2011. The entire contents of the application identified above is incorporated by reference herein and made a part of this specification.

BACKGROUND

1. Field of the Inventions

The present inventions relate generally to mounting systems for eyewear, and more specifically to methods and apparatuses for mounting and retaining optical lenses.

2. Description of the Related Art

A wide variety of improvements have been made in recent years in the eyewear field, particularly with respect to eyewear intended for use in active sports or as fashion sunglasses. These eyewear designs provide a variety of functional improvements, such as maximizing interception of peripheral light, reducing optical distortion and increasing the wearer's comfort level, compared to previous active sport eyewear.

A continuing objective in the field of high quality eyewear, particularly that is intended for use in high speed action sports, is minimizing distortion introduced by the eyewear. Distortion may be introduced by any of a variety of influences, such as poor construction materials for the optical portion of the lens and inferior polishing and/or molding techniques for the lens. In addition, optical distortion can result from the interaction of the lens with the frame, such as changes in the shape of the lens orbital or poor orientation of the lens with respect to the wearer's normal line of sight.

Eyeglass systems which use a polymeric or metal wire frame are especially susceptible to bending and flexing due to a variety of environmental causes such as impact, storage-induced forces, forces resulting from the assembly process of the eyewear, and exposure to sunlight and heat. Flexing of the lens or uncontrolled deviation of the orientation of one lens with respect to the other or with respect to the earstems can undesirably change the optical characteristics of the eyeglasses, whether the optical lens is corrective (prescription) or noncorrective.

Additionally, many eyewear systems are assembled in which the lens is retained using an interference fit. Dual lens eyewear comprises a frame having a pair of orbitals that support lenses of the eyeglasses. The frame is usually formed as a single component that is later hingedly attached to left and right earstems that allow the eyeglasses to be worn by a user. In some cases, the left and right orbitals generally continuously surround the respective left and right lenses. In order to accommodate the lenses in the orbitals of the frame, the orbitals may include a groove that runs within the perimeter of the orbital. The bottom of the groove is generally formed to match the perimeter geometry of the lens. During assembly of the eyeglass, the lens is forcibly inserted into the groove of the orbital to produce a very tight interference fit. Unfortunately, that deformation can produce optical distortions or other unwanted stresses on the lenses.

A further consideration in eyeglass design is the ease of interchangeability of the lens. In dual lens eyeglasses having a continuous annular orbital, for example, removal of the lens such as for replacement is difficult and often impossible for the end user. Accordingly, there remains a need for further improvement in various aspects of eyeglass lens retention assemblies.

SUMMARY

Several advantageous features can be present in embodiments of eyewear, such as an eyeglass or goggle, that incorporates one or more of the features disclosed herein. While these features may be illustrated with regard to a unitary lens eyeglass, these features can also be incorporated into dual lens eyewear or into a goggle. Accordingly, the present discussion and embodiments are intended to illustrate features that can be applied to dual or unitary lens eyeglasses or goggles, although illustration and discussion will be shown for unitary lens eyeglasses for the sake of brevity. Thus, goggle embodiments can be provided which include the advantageous features disclosed herein. As used herein, in accordance with the customary understanding in this art, the term "eyeglass" and similar terms include products with glass or non-glass lens that are corrective or non-corrective.

Further, a continuing objective in the field of high performance eyewear, particularly for eyewear which is intended for use in high-speed action sports or military applications, is ballistic resistance and lens stability. Various improvements have been made that enable a wearer to quickly modify eyewear using replaceable components and/or lenses, such by using the systems disclosed in U.S. Pat. Nos. 4,730,915, 5,387,949, and 7,347,545, the entirety of the disclosure of each of which is incorporated herein by reference. In some embodiments disclosed herein, additional support can be provided to a replaceable or removable lens in order to enhance the ballistic resistance and lens stability of an eyeglass or goggle. Some examples of support features are shown in Applicants' U.S. Patent Application Publication No. 2010/0085533, published on Apr. 8, 2010, now U.S. Pat. No. 7,954,942, issued on Jun. 7, 2011, the entirety of which is incorporated herein by reference. Further examples of support features are shown in Applicants' copending U.S. Patent Application Publication No. 2011/0007262, published on Jan. 13, 2011, U.S. application Ser. No. 13/020,747, filed on Feb. 3, 2011, and U.S. application Ser. No. 13/051,913, filed on Mar. 18, 2011, the entireties of each of which are incorporated herein by reference.

In some embodiments, at least in part, a durable eyeglass or goggle design can enable the lens to be secured with an earstem of the eyeglass or goggle using one or more retention assemblies or devices. Further, a lens of the eyeglass or goggle can comprise corresponding engagement features that enable the lens to be coupled to the earstem.

Some embodiments can advantageously securely retain the lens relative to the frame while generally preserving optimal optical characteristics (e.g., without undermining, diminishing, or ruining the optical characteristics of the lens). For example, the lens can be secured to and/or supported by the frame in a manner that generally preserves the as-molded geometry of the lens. Moreover, embodiments disclosed herein can advantageously provide an eyeglass or goggle in which the lens can be easily removed and replaced by the wearer while enabling the wearer to mount the lens while providing superior ballistic resistance and lens stability.

To achieve some of the above-noted benefits, some embodiments provide an eyeglass or goggle eyewear that can support at least one lens in a field of view of a wearer. The eyewear can comprise retention means for securing the lens relative to the earstems. The retention means can comprise one or more retention assemblies. The retention assembly can comprise a stationary or passive retention mechanism and/or a movable or active retention mechanism for securing the lens relative to the earstem.

Further, some embodiments of a retention assembly can comprise one or more lenses having at least one engagement portion. The engagement portion(s) of the lens can have a shape that is generally complimentary to a corresponding retention mechanism(s), engagement structure(s), or restraining portion(s) of the earstem so that the lens and the earstem can closely fit together. For example, the engagement portion(s) of the lens can comprise a recess, protrusion, aperture, detent, peripheral cutout, or other engageable structure. The retention mechanism(s), engagement structure(s), or restraining portion(s) of the earstem can engage the engagement portion(s) of the lens for securing the lens relative to the earstem.

For example, in a unitary lens embodiment, retention mechanisms can interact with opposing sides or ends of the lens(es). For example, one of the retention mechanisms of the lens can be located along a lateral side of the lens and can form a coupling between the lens and an earstem of the eyeglass. The retention mechanism of each earstem can be disposed along an anterior end of the earstem and can be configured to receive, engage with, and/or be received by a respective retention mechanism of the lens. The retention assembly can restrain one or more degrees of freedom of movement of the lens relative to the earstem.

In some embodiments, the earstem can comprise a movable or active lens retention mechanism. The active lens retention mechanism can be configured as a lever or latch device for engaging an engagement portion of the lens to secure the lens relative to the earstem. The latch device can comprise an engagement structure that is movable between a disengaged position and an engaged position for engaging with the retention mechanism or engagement portion of the lens. The engagement structure of the latch device can directly or indirectly engage with the retention mechanism or engagement portion of the lens.

BRIEF DESCRIPTION OF THE DRAWINGS

Various features of illustrative embodiments of the inventions are described below with reference to the drawings. The illustrated embodiments are intended to illustrate, but not to limit, the inventions. The drawings contain the following figures:

FIG. 27 is a cross-sectional perspective view of the retention assembly shown in FIG. 24 taken along section lines 27-27 of FIG. 24, wherein the coupling mechanism is in an engaged position, according to an embodiment.

FIG. 28A-B are a perspective and perspective cross-sectional views of the lever mechanism and biasing mechanism of the retention assembly of FIG. 24, according to an embodiment.

DETAILED DESCRIPTION

While the present description sets forth specific details of various embodiments, it will be appreciated that the description is illustrative only and should not be construed in any way as limiting. Additionally, although particular embodiments of the present inventions may be disclosed or shown in the context of unitary or dual lens eyewear systems, such embodiments can be used in both unitary and dual lens eyewear systems. Further, although embodiments disclosed herein can be used with eyeglasses, such embodiments can also be used with goggles. Embodiments are illustrated and discussed generally with respect to dual lens eyeglasses for sake of brevity, though such embodiments can be used with unitary or dual lens eyeglasses or goggles.

Further, although particular embodiments may be disclosed or shown in the context of frameless eyewear (eyeglasses or goggles) having a unitary lens, such embodiments can be used with frames having either full or partial orbitals. Further, although the mounting mechanisms or retention assemblies disclosed herein are shown as attaching an earstem to a lens, embodiments of these mechanisms or assemblies can be used to interconnect one or more components of the eyewear, such as lens(es), earstems, frames, and other components. Retention components and structures in accordance with embodiments disclosed herein can also be utilized to interconnect one or more components of the eyewear, such as earstems and/or frame components of the eyewear. The retention assemblies may be utilized either as the primary connector or as a secondary connector for cooperation with another retention assembly or system. Furthermore, various applications of such embodiments and modifications thereto are also encompassed by the general concepts described herein.

Figure 1:
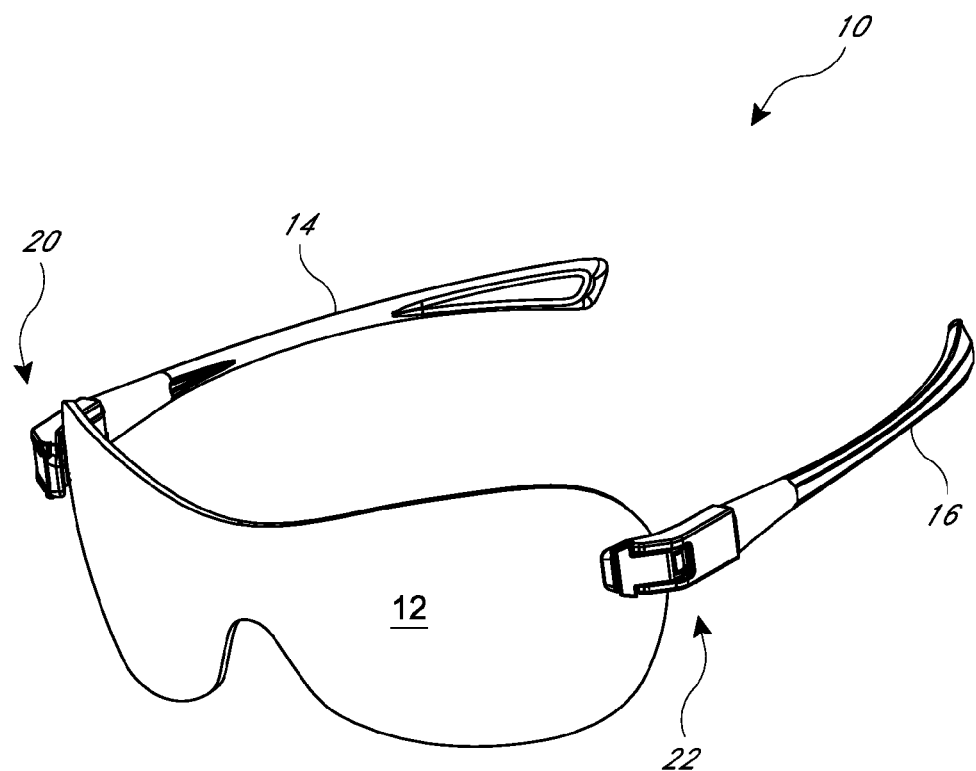
FIG. 1 is a front perspective view of an eyeglass in accordance with an embodiment of the present inventions.
Figure 2:
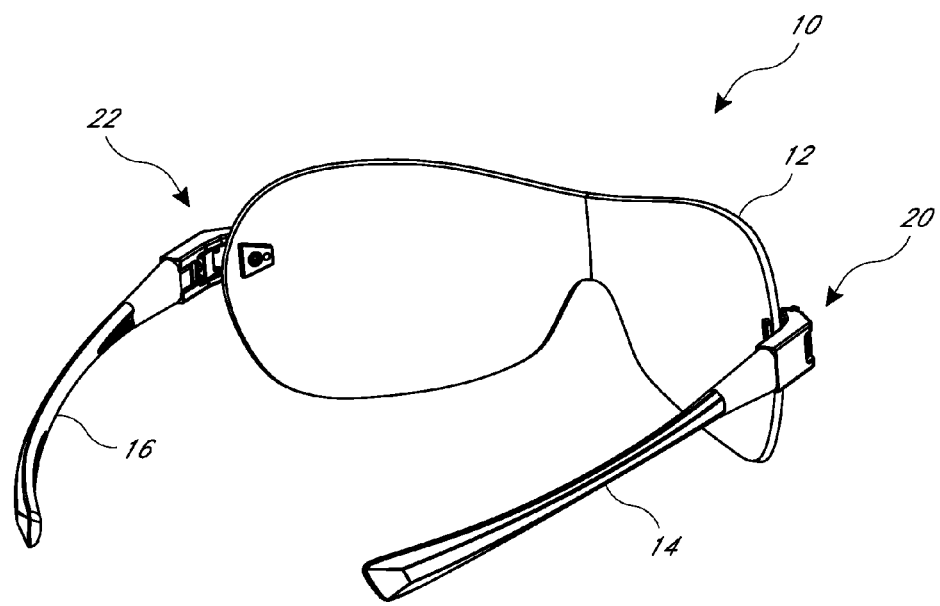
FIG. 2 is a rear perspective view of the eyeglass of FIG. 1.

FIGS. 1-28B illustrate embodiments of the present inventions. FIG. 1 is a front perspective view of an eyeglass 10 in accordance with an embodiment of the present inventions. FIG. 2 is a rear perspective view of the eyeglass 10. As illustrated, the eyeglass can have a unitary lens 12 and a pair of earstems 14, 16. The earstems 14, 16 can be removably attached to the lens 12 using respective retention mechanisms 20, 22. The retention mechanisms 20, 22 can be used to interchange one unitary lens for another unitary lens in order to allow the wearer to customize the look and feel of the eyeglass 10. Additionally, one or more different nosepieces (not shown) can be coupled to and interchanged with the nosepiece opening of the lens.

Figure 3:
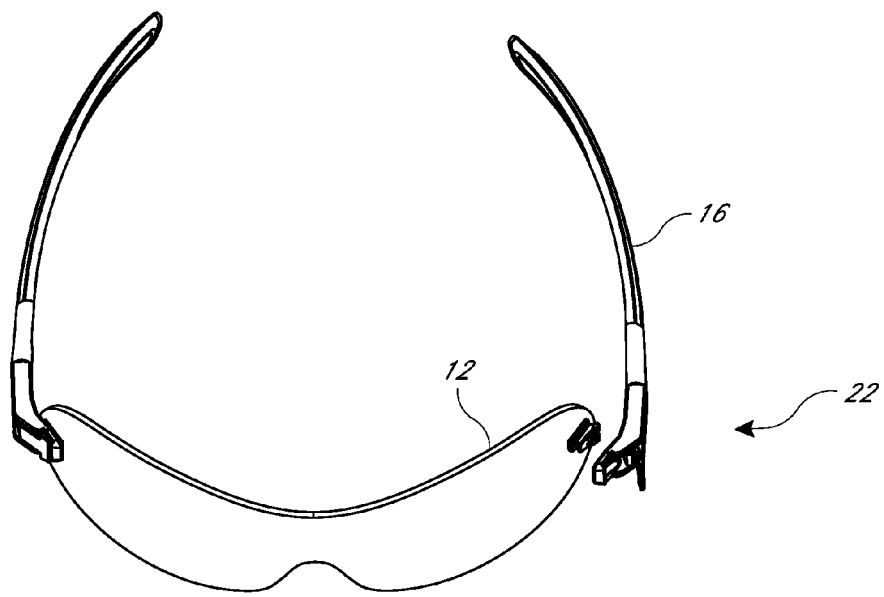
FIG. 3 is a front elevational view of the eyeglass of FIG. 1 wherein an earstem thereof is detached from the lens.
Figure 4A:
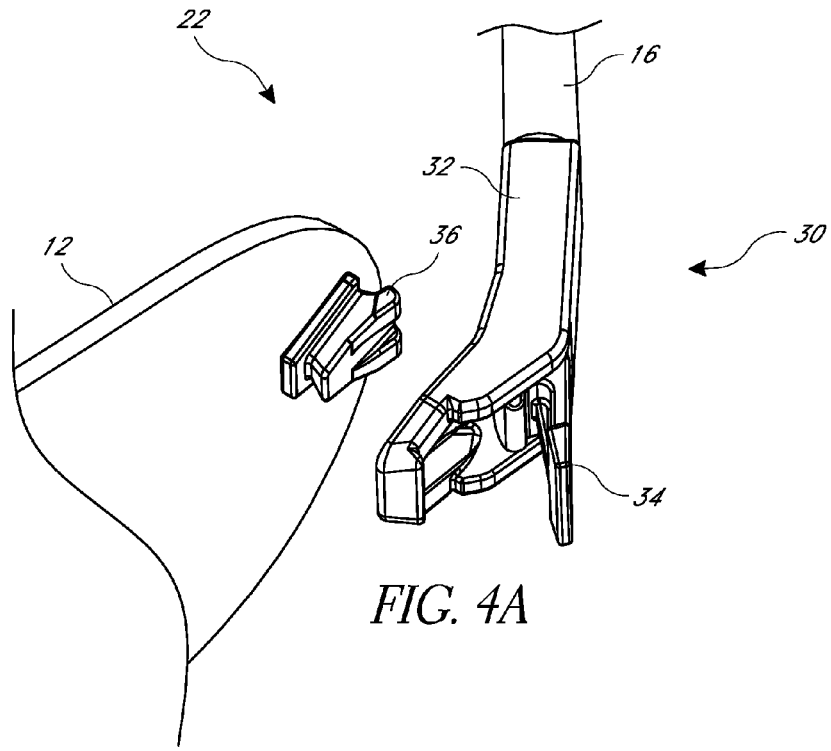
FIG. 4A is a front elevational view of a retention assembly, according to an embodiment.
Figure 4B:
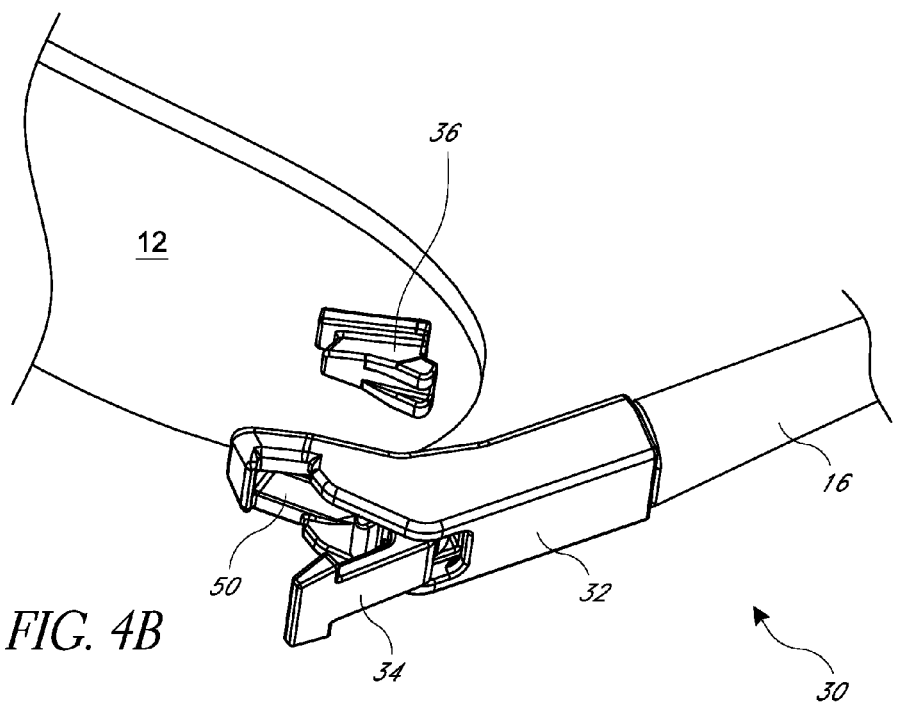
FIG. 4B is a side elevational view of the retention assembly shown in FIG. 4A.

As shown in FIG. 3, the retention assembly 22 can allow the earstem 16 to be decoupled from the lens 12. FIGS. 4A-B are enlarged elevational views of the retention assembly 22, according to an embodiment. As illustrated, the retention assembly 22 can comprise a coupling mechanism 30 that comprises a housing 32, a lever mechanism 34, an engagement protrusion 36, and in some embodiments, a biasing mechanism (not shown). The lever mechanism 34 can be rotatably mounted relative to the housing 32. The coupling mechanism 30 can be attached to an anterior end of the earstem 16. The engagement protrusion 36 can be mounted onto a lateral portion of the lens 12. The coupling mechanism 30 can be configured to receive and engage with the engagement protrusion 36. In some embodiments, the housing 32 of the coupling mechanism 30 can be configured to comprise an opening 50 that is configured to allow the engagement protrusion 36 to be removably inserted into the opening 50 and to engage with the housing 32. Features of the engagement between the engagement protrusion 36 and the coupling mechanism 30 are illustrated and discussed further herein.

Figures 5, 6A:
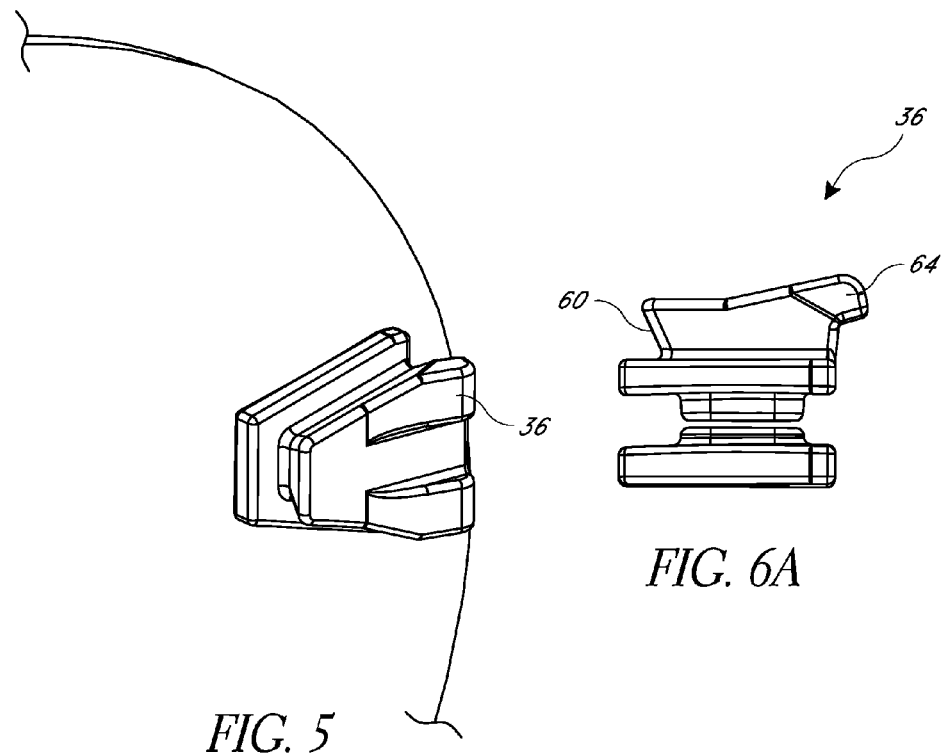
FIG. 5 is a front perspective view of an engagement protrusion attached to a lens of the retention assembly of FIG. 4A, in accordance with an embodiment.
FIG. 6A is a side view of the engagement protrusion of FIG. 5.
Figures 6B, 6C:
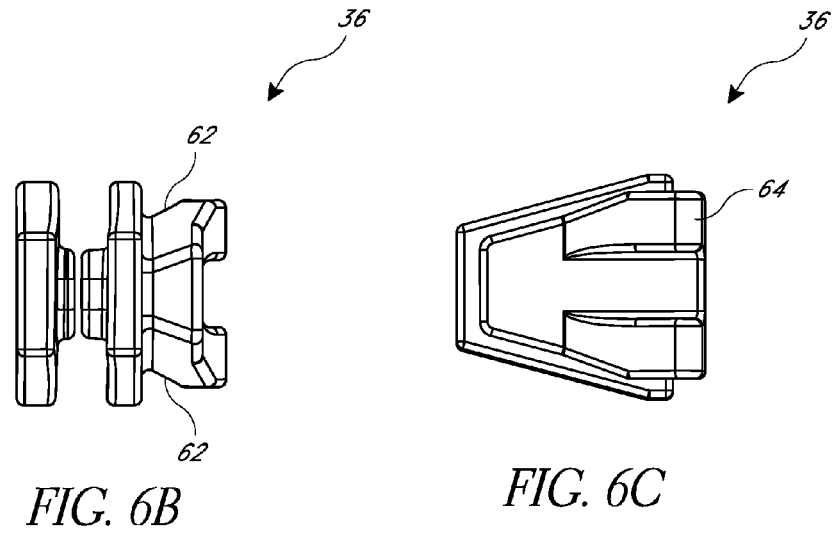
FIG. 6B is a front view of the engagement protrusion of FIG. 5.
FIG. 6C is a top view of the engagement protrusion of FIG. 5.

FIG. 5 is a front perspective view of the engagement protrusion 36 attached to the lens 12. As illustrated in FIGS. 6A-C, the engagement protrusion 36 can comprise a generally wedge-shape as seen from a top view and a generally wedge-shape as seen from a side view. FIG. 6A illustrates that a leading edge 60 can be inclined in order to provide an undercut section that can be engaged by a corresponding shape of the opening 50 of the housing 32. FIG. 6B also illustrates that lateral sides 62 of the protrusion 36 can also be inclined to provide an undercut section that can be engaged by a corresponding shape of the opening 50 of the housing 32. Some embodiments of the protrusion 36 can be configured such that the shape and configuration of the protrusion 36 need not incorporate wedge or undercut portions.

In accordance with some embodiments, such as those illustrated in FIGS. 5-6C, the shape of the engagement protrusion 36 can allow the engagement protrusion 36 to be easily inserted into a corresponding opening 50 of the housing 32. Further, in some embodiments, the engagement protrusion 36 can comprise an interlocking portion 64. The interlocking portion 64 can define an overhanging edge that can be interconnected with a corresponding hook or engagement portion of the lever mechanism, in accordance with some embodiments discussed further herein.

Figure 7A:
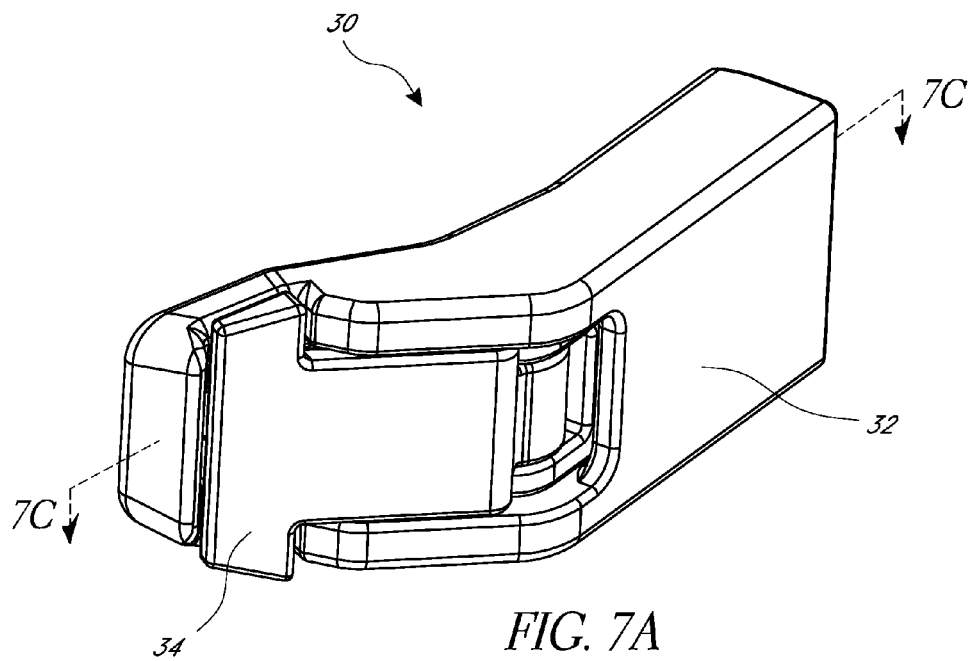
FIG. 7A is a front perspective view of a coupling mechanism of the retention assembly of FIG. 4A, in accordance with an embodiment.

FIG. 7A is a front perspective view of the coupling mechanism 30. The lever mechanism 34 can be rotatably mounted relative to the housing 32 in order to allow the lever mechanism 34 to be moved between open and closed positions. In some embodiments, the lever mechanism 34 can also be slidably mounted relative to the housing 32. Thus, rotational and sliding movements can be performed by a single mechanism of the retention assembly 22.

For example, a locking tab 74 of the lever mechanism 34 can be slidably and rotatably mounted to enable engagement or disengagement of the coupling mechanism 30 with the engagement protrusion 36. The movement of the locking tab 74 can allow the engagement protrusion 36 to be securely engaged on a plurality of edges or faces in order to securely mount the earstem 16 relative to the lens 12.

Figure 7B:
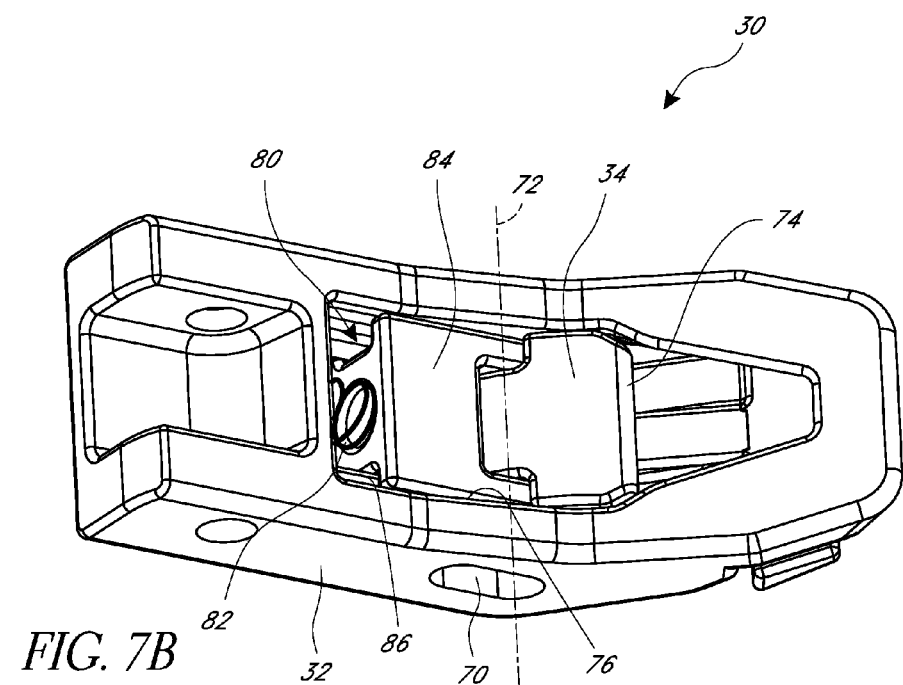
FIG. 7B is a rear perspective view of the coupling mechanism of FIG. 7A.

For example, as illustrated in FIG. 7B, the housing 32 can comprise a slot 70 and the lever mechanism 34 can be rotatably coupled relative to the housing 32 to define an axis of rotation 72. The slot 70 is not essential and can be omitted in some embodiments. The presence of the slot 70 can aid in the assembly of some embodiments that use a pin to rotatably interconnect the lever mechanism 34 relative to the housing 32.

The axis of rotation 72 (whether defined by a pin, protrusions, or other means for rotatably coupling the lever mechanism 34 relative to the housing 32) can be slidable within the housing 32 in order to allow the lever mechanism 34 to be rotatable and slidable relative to an interior or engagement cavity 76 of the housing 32.

In the illustrated embodiment, the coupling mechanism 30 can further comprise a sliding or locking mechanism 80 that can be disposed within the engagement cavity 76 of the housing 32 and can urge the lever mechanism 34 to a given position relative to the engagement cavity 76 of the housing 32. In some embodiments, the sliding or locking mechanism 80 can comprise a biasing mechanism 82, such as the spring, that urges an interconnecting block 84 toward an extended position. The interconnecting block 84 can provide a rotational coupling with the lever mechanism 34.

In some embodiments, the interconnecting block 84 can also comprise one or more of alignment grooves or structures 86 that allow the interconnecting block 84 to provide a linear sliding movement of the lever mechanism 34. In some embodiments, the interconnecting block 84 can also serve to maintain the alignment of the axis 72 with the engagement cavity 76.

In some embodiments, the coupling mechanism 30 can also comprise a pin or protrusion that rotatably couples an anterior end of the interconnecting block 84 with a posterior end of the lever mechanism 34 and with the slot 70 or a corresponding protrusion or recessed within the engagement cavity 76. In such embodiments, the alignment of the lever mechanism 34 and the sliding or locking mechanism 80 can be maintained relative to the engagement cavity 76 of the housing 32 during sliding movement thereof. For example, the pin or protrusion can comprise a separately-formed elongate pin that extends through apertures formed in the interconnecting block 84, the lever mechanism 34, and one or more slots of the housing 32. However, one or more protrusions can be formed on the interconnecting block 84, the lever mechanism 34, and/or the housing 32 that can be rotatably coupled with the interconnecting block 84, lever mechanism 34, and/or the housing 32. Various combinations and configurations can be developed using these teachings.

Figure 7C:
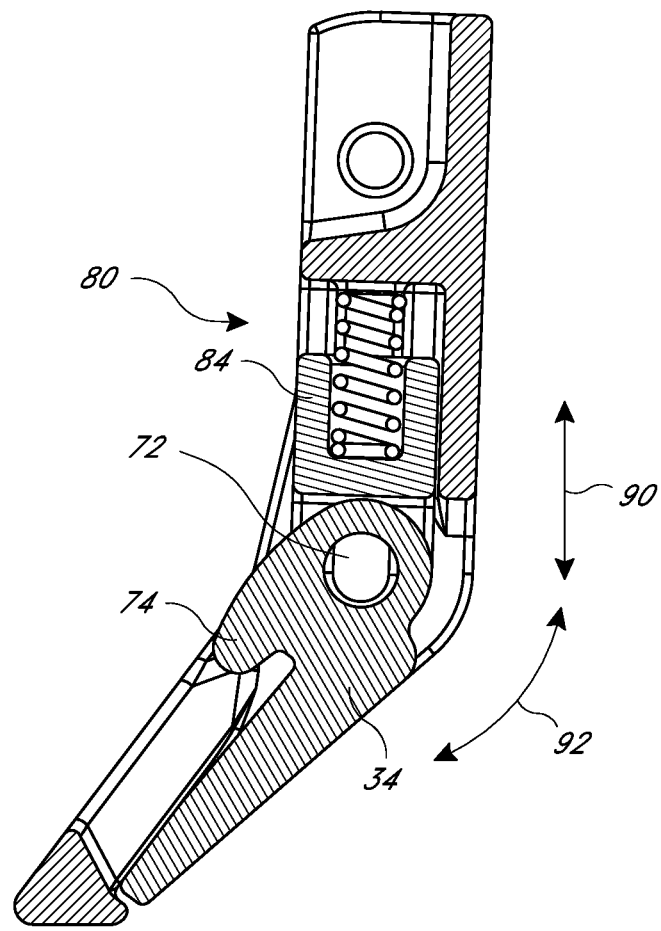
FIG. 7C is a cross-sectional top view of the coupling mechanism of FIG. 7A taken along section lines 7C-7C of FIG. 7A.
Figure 8A:
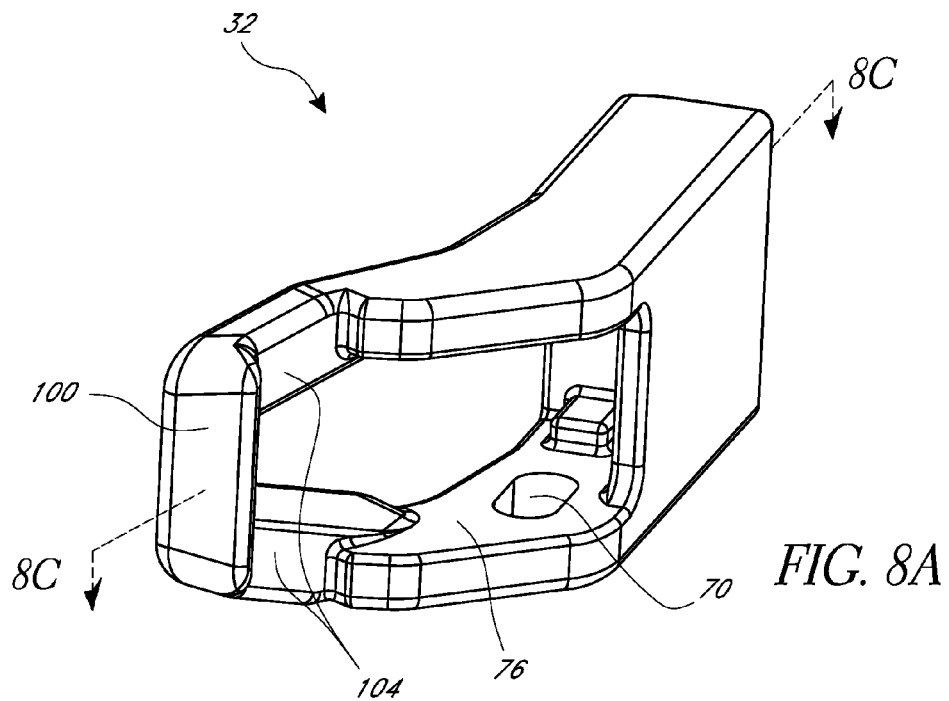
FIG. 8A is a front perspective view of a housing of the coupling mechanism of FIG. 7A, in accordance with an embodiment.
Figure 8B:
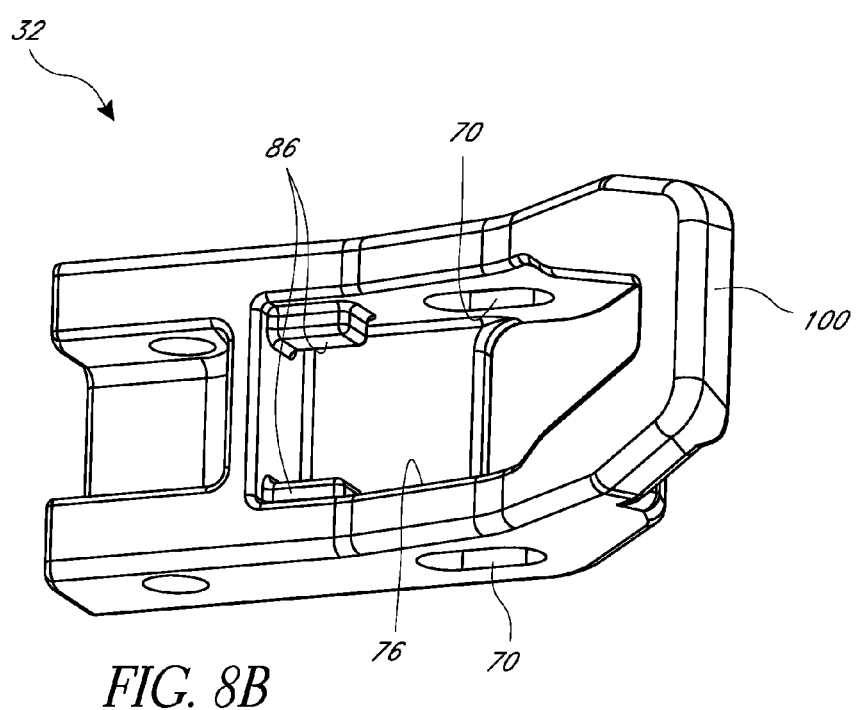
FIG. 8B is a rear perspective view of the housing of FIG. 8A.
Figure 8D:
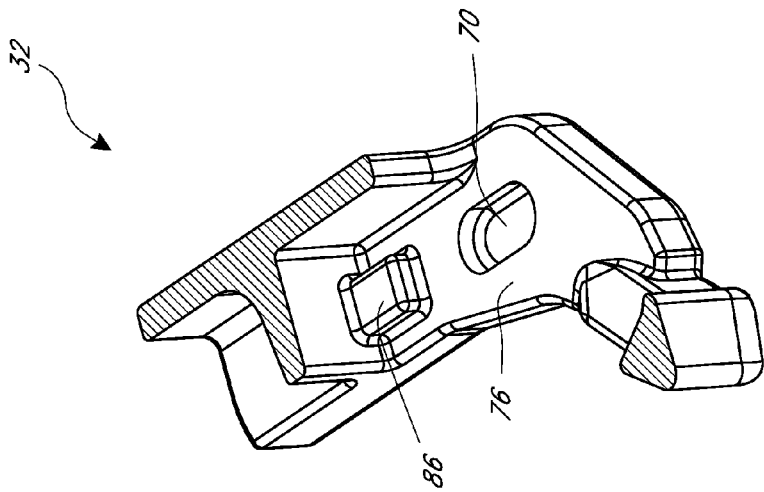
FIG. 8D is a perspective view of the cross-section of the housing shown in FIG. 8C.
Figure 8C:
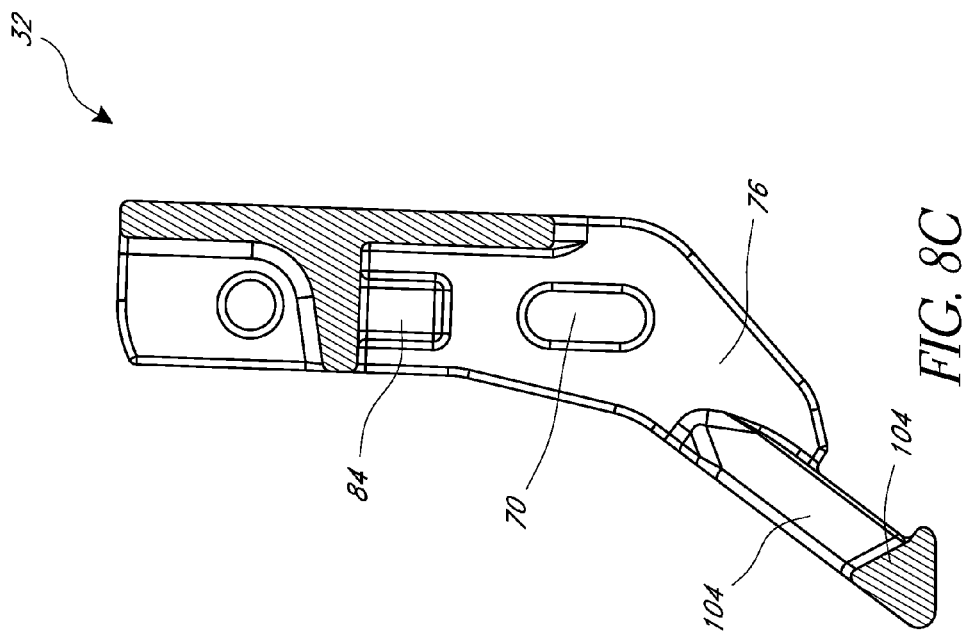
FIG. 8C is a cross-sectional top view of the housing of FIG. 8A taken along section lines 8C-8C of FIG. 8A.

FIG. 7C is a cross-sectional top view of the coupling mechanism of FIG. 7A taken along section lines 7C-7C of FIG. 7A. The embodiment of FIG. 7C can slide as shown by the arrows 90 or rotate as shown by the arrows 92. Such movement of the lever mechanism 34 can enable the locking tab 74 of the lever mechanism 34 to slide over the interlocking portion 64 of the engagement protrusion 36, rotate, and slide under the interlocking portion 64 to engage with the engagement protrusion 36. This interaction between the lever mechanism 34 and the engagement protrusion 36 can allow the earstem 16 two withstand significant forces from all directions, and especially lateral forces that would tend to dislodge or disengage the coupling mechanism 30 from the engagement protrusion 36.

FIGS. 8A-D illustrate various views of an embodiment of the housing 32. These figures illustrate an exemplary configuration of the engagement cavity 76 having a slot 70 disposed at upper and lower ends of the engagement cavity 76. Further, a pair of alignment protrusions 86 are also illustrated. In addition, an anterior end 100 of the housing 32 can define an opening 102 configured to receive the engagement protrusion 36 therein.

As illustrated, and some embodiments, the opening 102 can be wedge-shaped and comprise one or more sloped surfaces 104 that can interact with one or more sloped surfaces of the engagement protrusion 36. The wedge shape of the opening 102 can allow the engagement protrusion 36 to be easily inserted or removed from the opening 102. Further, the interaction of the sloped surfaces of the engagement protrusion 36 and the surfaces 104 can constrain the movement of the engagement protrusion 36 relative to the housing 32. Furthermore, the opening 102 and the engagement protrusion 36 can also be configured to comprise one or more straight edges, notches, or other distinctive shapes that prevent rotational movement of the engagement protrusion 36 while received within the opening 102.

Thus, in some embodiments, the interaction between the engagement protrusion 36 and the opening 102 can be sufficient to constrain all but one degree of movement of the engagement protrusion 36 relative to the housing 32. As discussed herein, various embodiments of a locking device are provided using a lever mechanism that can constrain the final degree of movement of the engagement protrusion 36 relative to the housing 32 such that an earstem can be securely mounted relative to the lens. As noted herein, embodiments of the coupling or retention mechanisms disclosed herein can be used not only between the earstem and a lens, but can also be used between other components of eyewear, such as along only a single earstem, on a frame, and relative to portions of the eyewear, such as between the lens(es), frame, earstem, or other components of an eyeglass or goggle.

Figure 9A:
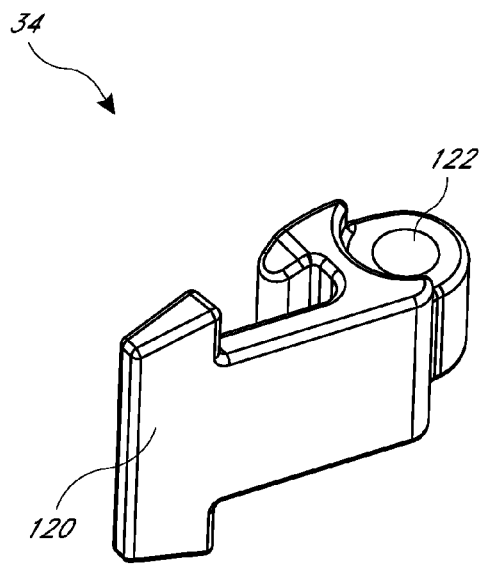
FIGS. 9A-C are front and rear perspective and top views of a lever mechanism of the retention assembly of FIG. 4A, according to an embodiment.
Figure 9B:
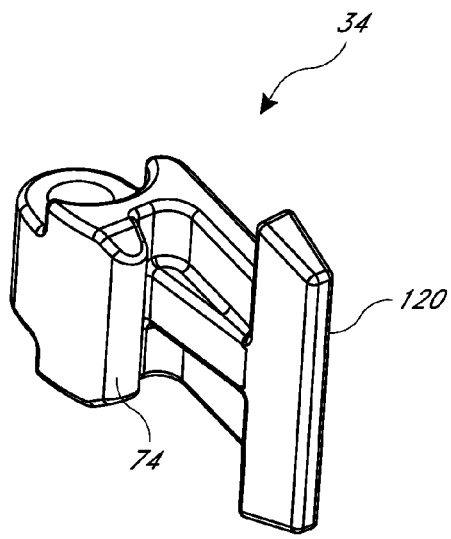
Figure 9C:
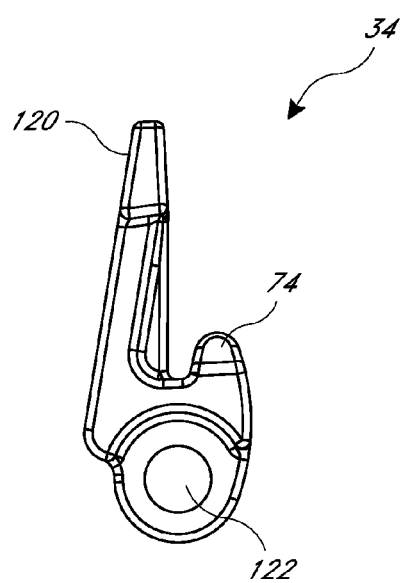

FIGS. 9A-C are front and rear perspective and top views of the lever mechanism 34, according to an embodiment. As illustrated, the lever mechanism 34 can comprise a handle portion 120, an aperture 122, and a locking tab 74. The handle portion 120 can be used to rotate the lever mechanism 34 in order to adjust the position of the locking tab 74 relative to the engagement protrusion 36. In the illustrated embodiment, the aperture 122 can be configured to receive a pin their through in order to facilitate rotation and/or sliding movement of the lever mechanism 34 relative to the housing 32.

Figure 10A:
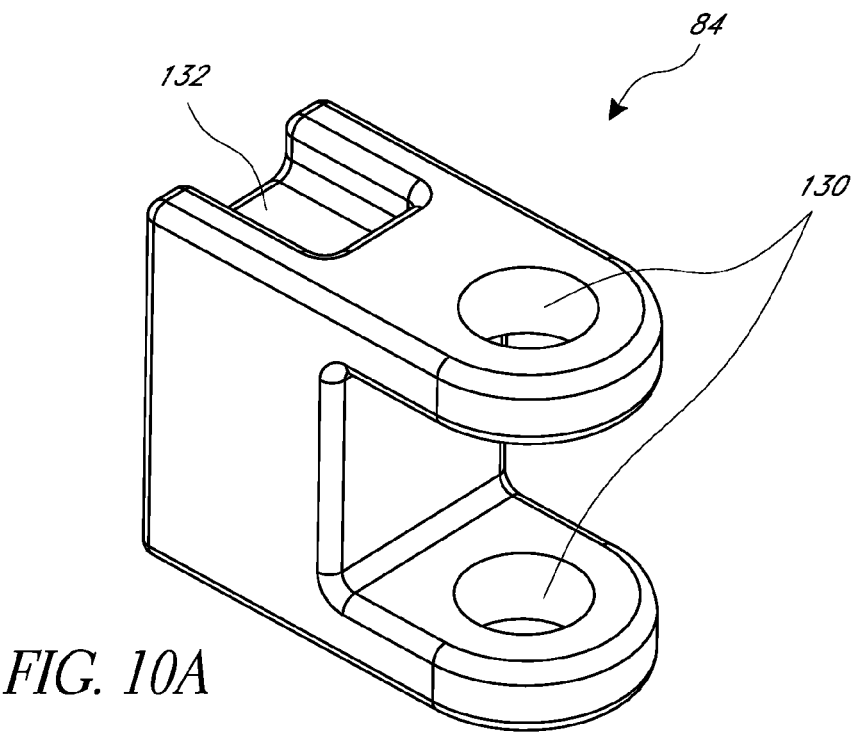
FIGS. 10A-B are front and rear perspective views of a biasing mechanism of the retention assembly of FIG. 4A, according to an embodiment.
Figure 10B:
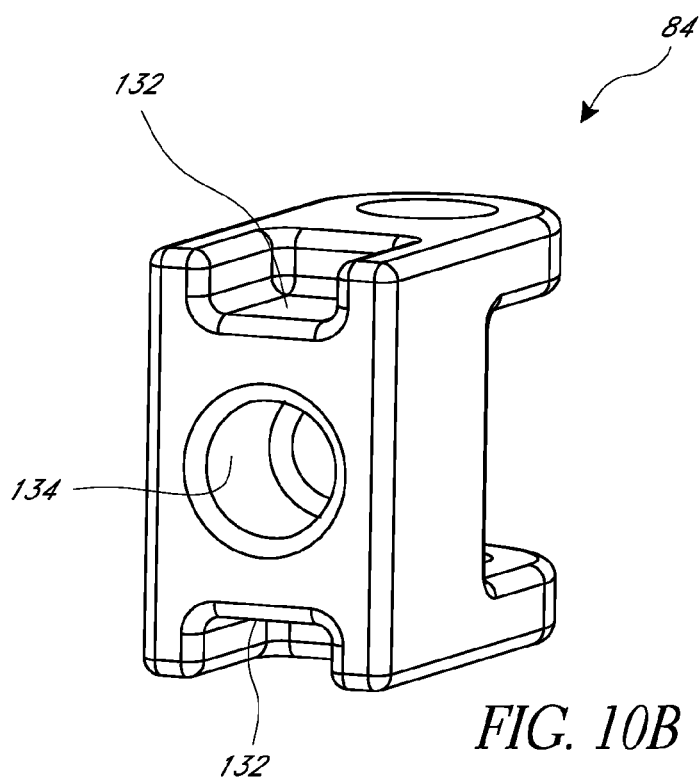

FIGS. 10A-B are front and rear perspective views of an embodiment of the interconnecting block 84 of the sliding or locking mechanism 80. As illustrated, the interconnecting block can comprise a pair of apertures 130 configured to rotationally couple the interconnecting block 84 relative to the lever mechanism 34 of the coupling mechanism 30. The interconnecting block 84 can comprise a pair of alignment recesses 132 that can interact with the alignment grooves or structures 86 of the housing 32 to facilitate sliding movement of the interconnecting block 84 relative to the housing 32. Additionally, the interconnecting block can comprise an engagement portion 134 for interconnecting with a biasing means, such as a coil spring, leaf spring, the deflectable biasing member, or other structure that can resiliently urge the interconnecting block 84 toward an extended or contracted position within the housing 32. In some embodiments, the biasing means can provide double or dual position biasing, urging the interconnecting block 84 away from an intermediate position. Thus, in some embodiments, the interconnecting block 84 can urge the lever mechanism 34 towards the open position or the closed position, but can intend to resist maintaining an intermediate closed position. In some embodiments, the interaction between the locking tab of the lever mechanism and the engagement protrusion and also tend to urge the lever mechanism towards either the open or closed position.

Figure 11A:
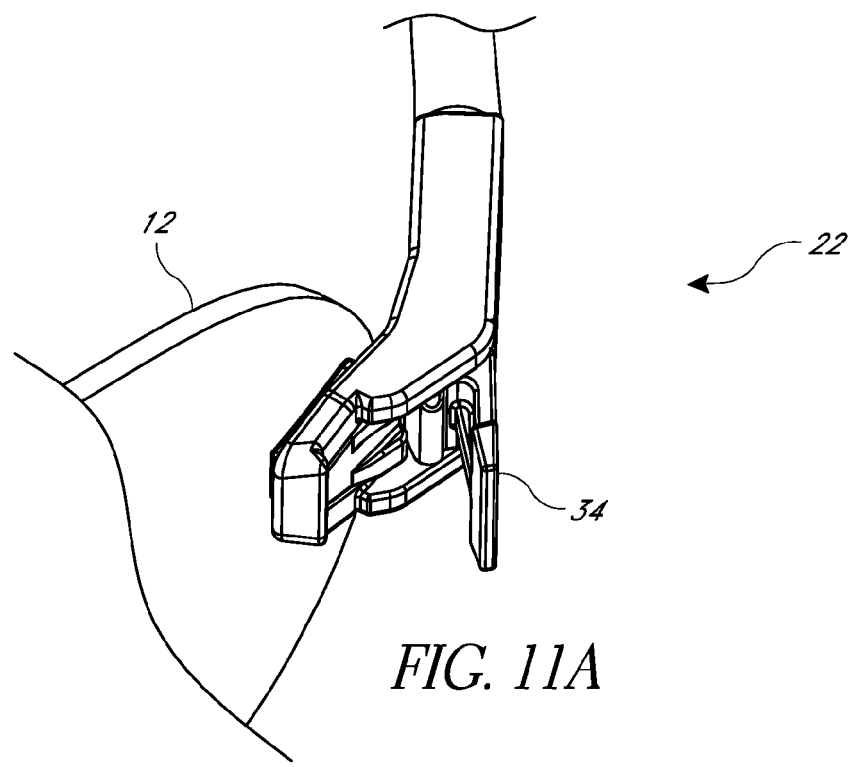
FIGS. 11A-B are perspective and cross-sectional views of the retention assembly wherein the lever mechanism is in an open position, according to an embodiment.
Figure 11B:
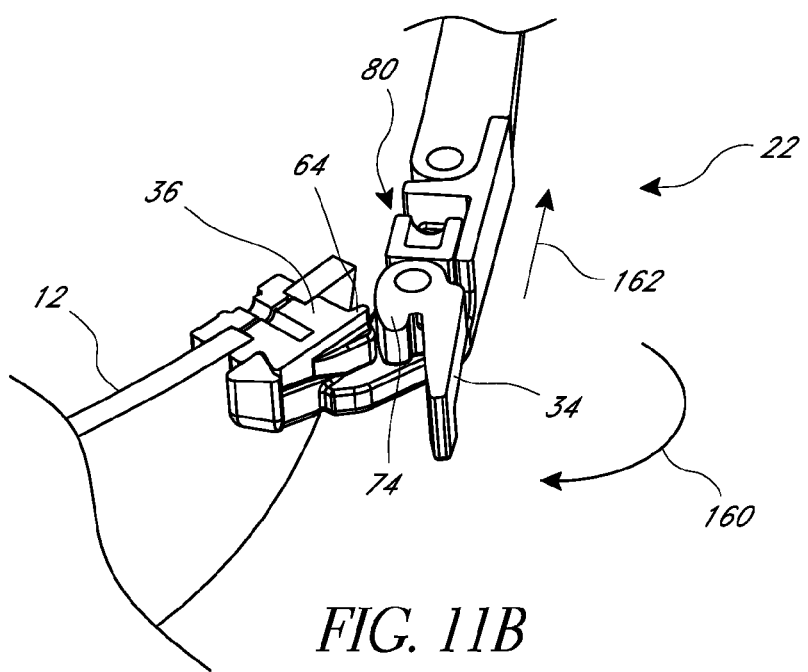
Figure 12A:
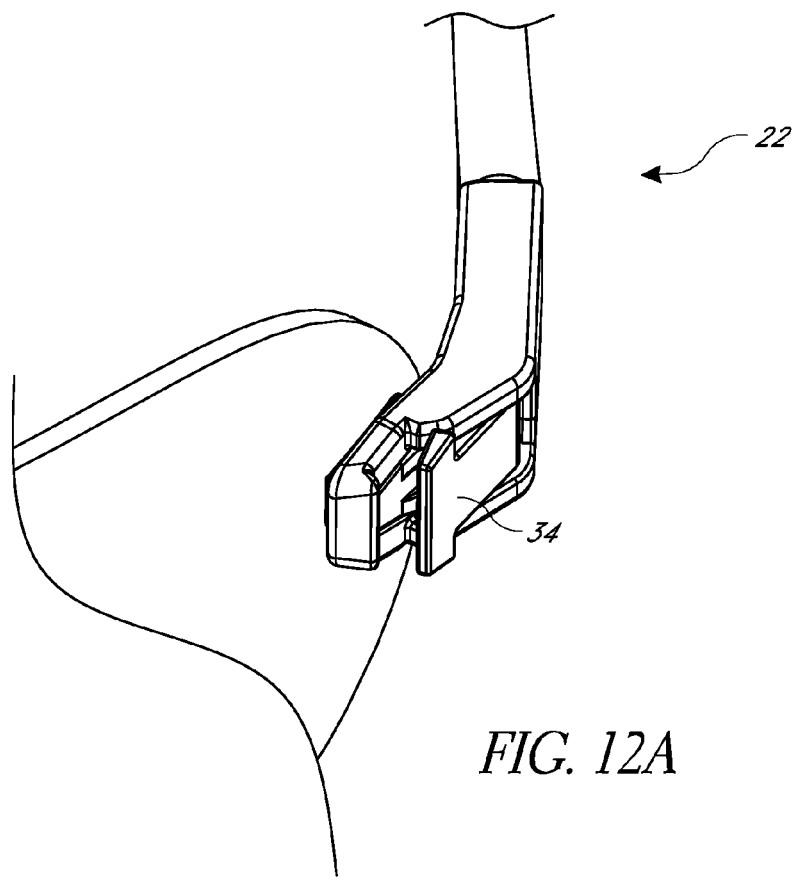
FIGS. 12A-B are perspective and cross-sectional views of the retention assembly wherein the lever mechanism is in a semi-closed position, according to an embodiment.
Figure 12B:
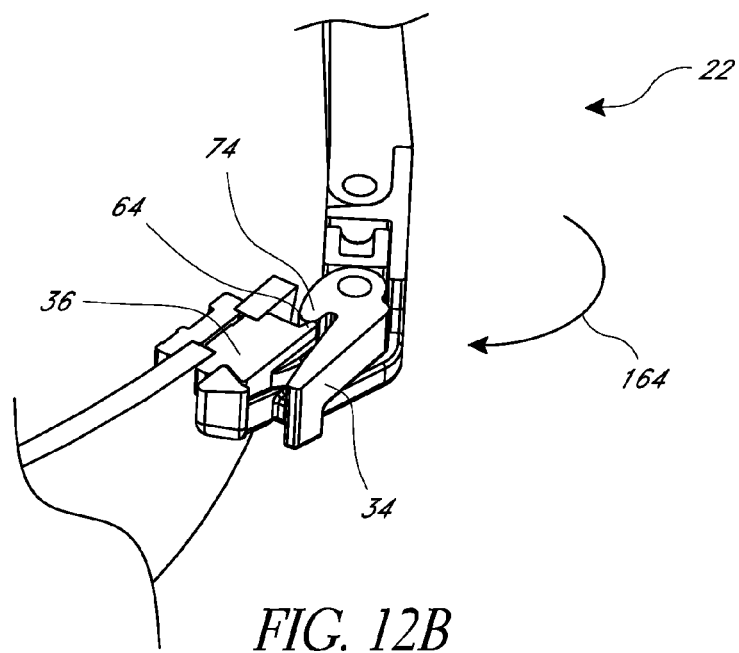
Figure 13A:
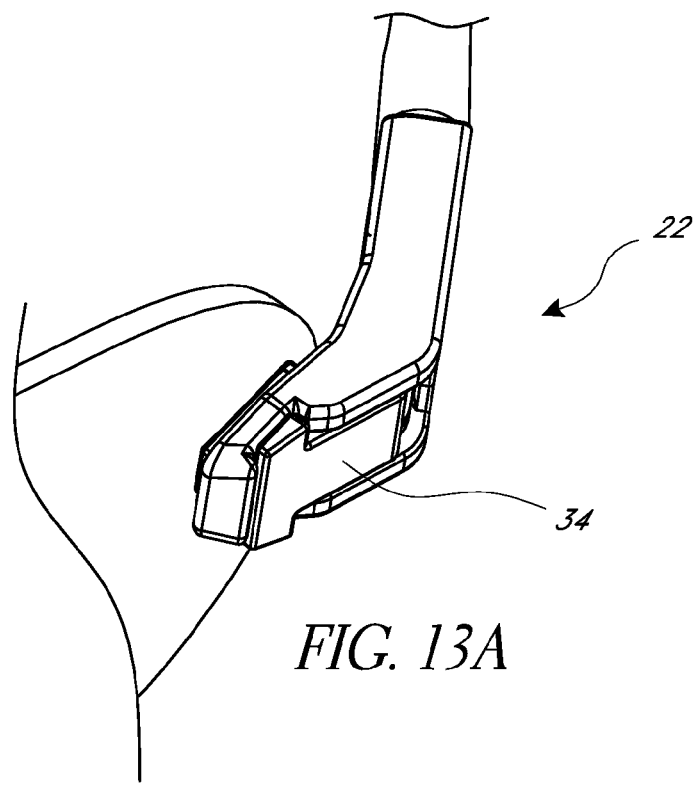
FIGS. 13A-B are perspective and cross-sectional views of the retention assembly wherein the lever mechanism is in a closed position, according to an embodiment.
Figure 13B:
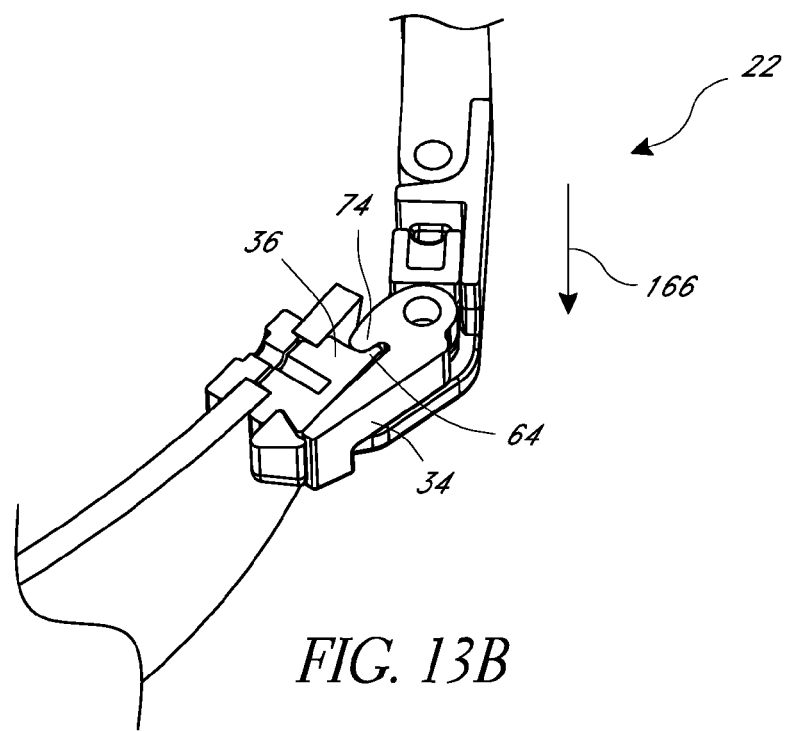

FIGS. 11A-13B illustrate various views of the retention assembly 22 during engagement and movement of the lever mechanism 34 relative to the protrusion 36. FIGS. 11A-B are perspective and cross-sectional views of the retention assembly 22 in which the lever mechanism 34 is in an open position. FIGS. 12A-B are perspective and cross-sectional views of the retention assembly 22 in which the lever mechanism 34 is in a semi-closed position. FIGS. 13A-B are perspective and cross-sectional views of the retention assembly 22 in which the lever mechanism 34 is in a closed position.

In accordance with the embodiment illustrated in these figures, the locking tab 74 of the lever mechanism 34 can engage with an interlocking portion 64 of the engagement protrusion 36 by completing a rotational and sliding movement illustrated between the open and closed positions. For example, in FIG. 11B, the locking tab 74 can initially encounter resistance to rotation as the tab is urged in the direction of arrow 160. Accordingly, the lever mechanism 34 must slide in the direction of the arrow 162, thus forcing the biasing mechanism 82 of the sliding or locking mechanism 80 into a compressed configuration. Once the lever mechanism 34 slides a sufficient amount, as shown in FIG. 12B, the locking tab 74 can rotate in the direction of arrow 164 until passing the interlocking portion 64 of the engagement protrusion 36. Once the locking tab 74 rotates a sufficient amount to pass the interlocking portion 64, the lever mechanism 34 is urged in a direction of the arrow 166 until the locking tab 74 and the interlocking portion 64 are engaged with each other.

In some embodiments, the engagement of the locking tab 74 and the interlocking portion 64 can be facilitated by cooperating or complementary recesses and protrusions, as shown in the illustrated embodiment. The locking tab 74 and the interlocking protrusion 64 can each comprise one or more interlocking structures that enable secure engagement between these components. Accordingly, the interaction between the locking tab 74 and the interlocking protrusion 64 can securely retained the engagement protrusion 36 relative to the coupling mechanism 30. In some embodiments, this engagement can restrict a final degree of movement between these components. Further, the interaction between the locking tab 74 and the interlocking protrusion 64, as shown in the illustrated embodiment, can be such that the lever mechanism 34 cannot be rotated once the locking tab 74 and the interlocking protrusion 64 are engaged with each other. For example, in order to disengage the locking tab 74 and the interlocking protrusion 64, the lever mechanism 34 would need to slide against the biasing force of the biasing mechanism 84 until sufficient clearance is provided to rotate the locking tab 74 until passing the interlocking protrusion 64. Accordingly, such embodiments can advantageously prevent unintentional rotation or disengagement of the lever mechanism 34 during casual use.

Figure 14:
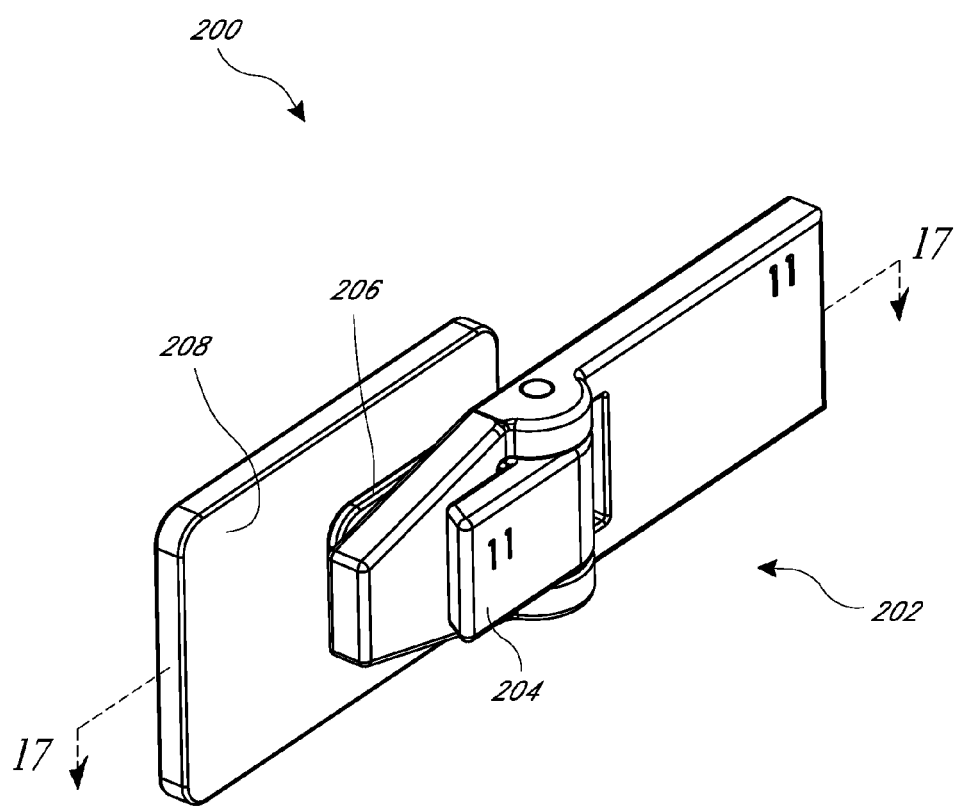
FIG. 14 is a perspective view of another embodiment of a retention assembly.

FIGS. 14-18 illustrate another embodiment of a retention assembly 200. FIG. 14 is a perspective view of the retention assembly 200. The retention assembly 200 can comprise a coupling mechanism 202, a lever mechanism 204, an engagement protrusion 206, and a sliding or locking mechanism (not shown). The engagement protrusion 206 can be attached to a lens 208 or other structure of eyewear.

Figure 15A:
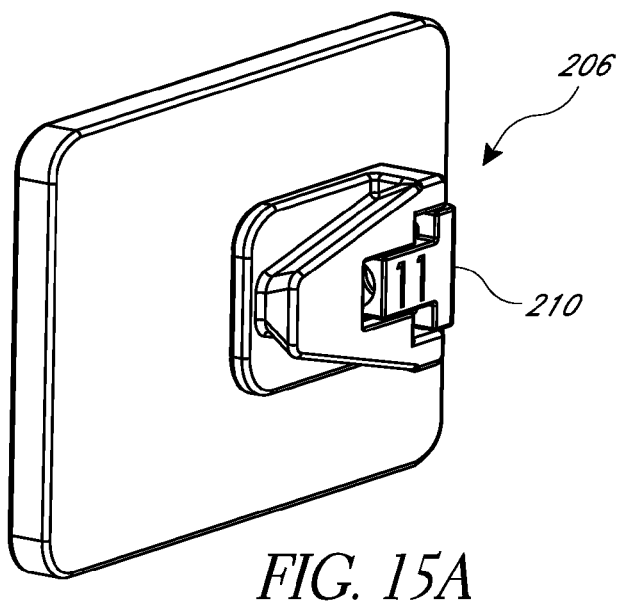
FIGS. 15A-B are perspective and side views of an engagement protrusion of the retention assembly of FIG. 14, according to an embodiment.
Figure 15B:
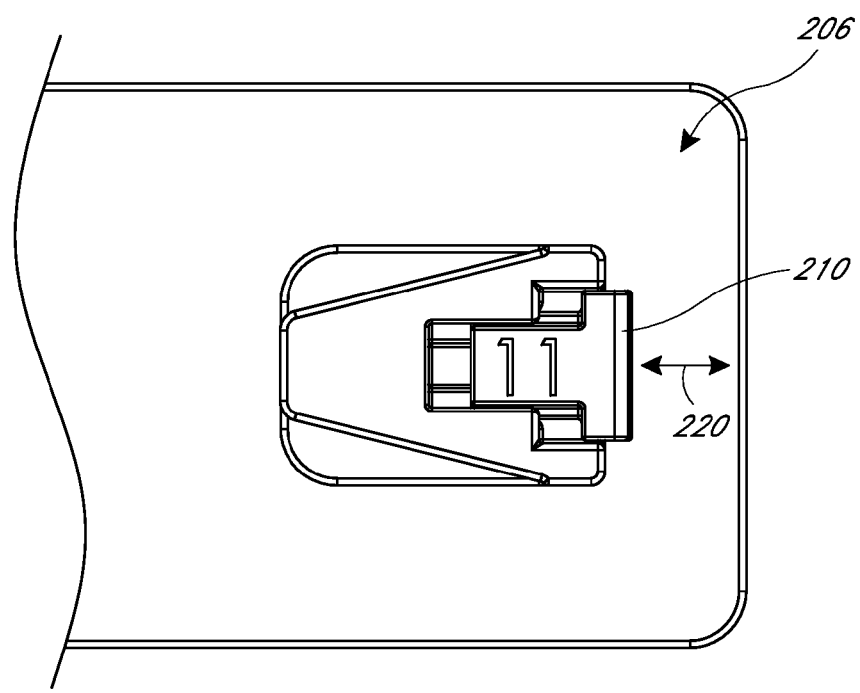
Figure 18:
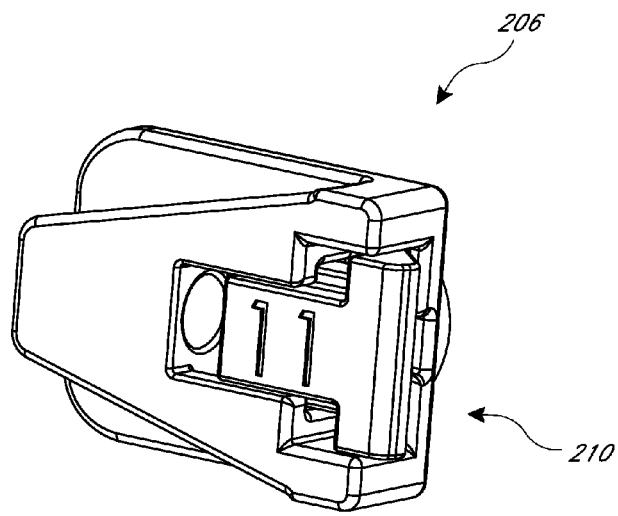
FIG. 18 is a perspective view of the engagement protrusion and biasing mechanism of the retention assembly of FIG. 14, according to an embodiment.

FIGS. 15A-B are perspective and side views of the engagement protrusion 206, and FIG. 18 is a rear perspective view of the engagement protrusion 206 illustrating a sliding or locking mechanism 210 integrated into the engagement protrusion 206 they can facilitate engagement between the engagement protrusion 206 and the lever mechanism 204. The structure and configuration of the engagement protrusion 206 can be similar to that of the engagement protrusion 36 discussed above. Accordingly, such features are incorporated herein by reference and will not be repeated for brevity. In contrast to the embodiment of the engagement protrusion 36 discussed above, the engagement protrusion 206 can be configured such that the sliding mechanism 210 is integrated into the engagement protrusion 206. As illustrated, the sliding mechanism 210 can move relative to the engagement protrusion 206 in the direction of the arrow 220.

Figure 16A:
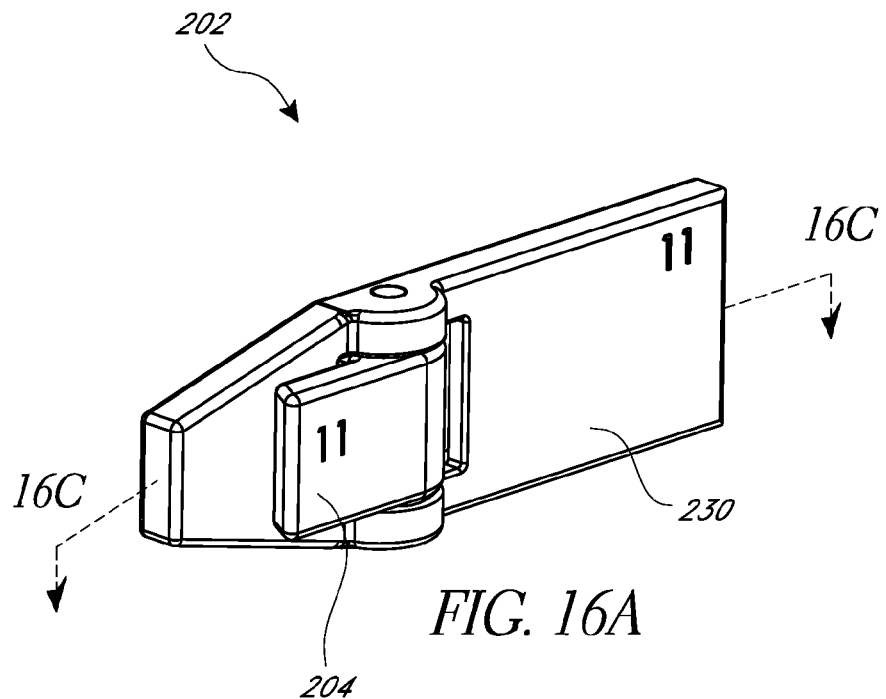
FIGS. 16A-C are front and rear perspective and cross-sectional views of a coupling mechanism of the retention assembly of FIG. 14, according to an embodiment.
Figure 16B:
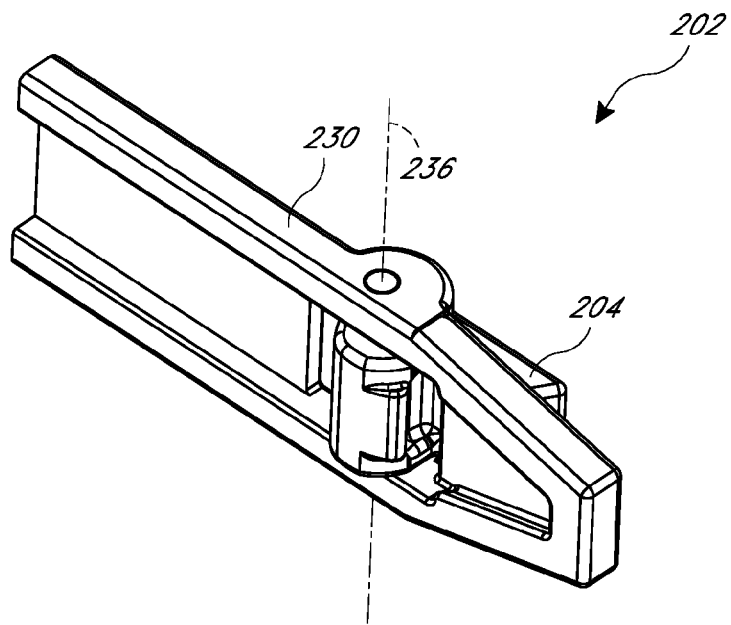
Figure 16C:
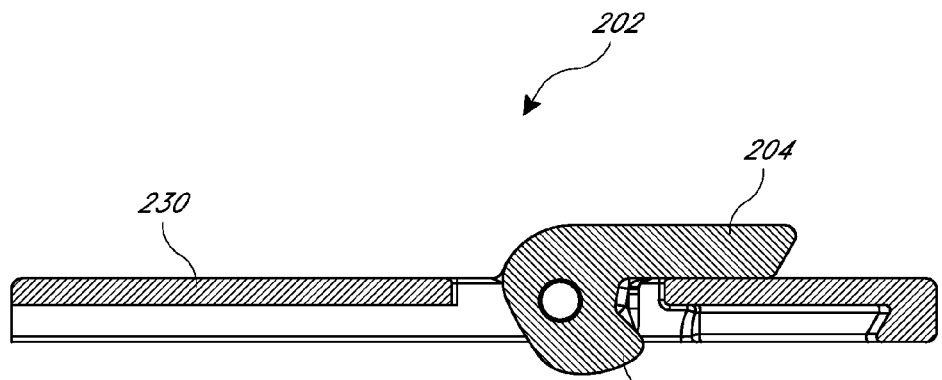

FIGS. 16A-C are front and rear perspective and cross-sectional views of an embodiment of the coupling mechanism 202. The coupling mechanism 202 can comprise a housing 230 and the lever mechanism 204. As illustrated, the lever mechanism 204 can be rotatably coupled to the housing 230. In contrast to the embodiment of the retention mechanism 22 discussed above, the lever mechanism 204 can define a fixed rotational axis 236. Thus, rotational and sliding movements can be performed by different mechanisms of the retention assembly 200.

Figure 17:
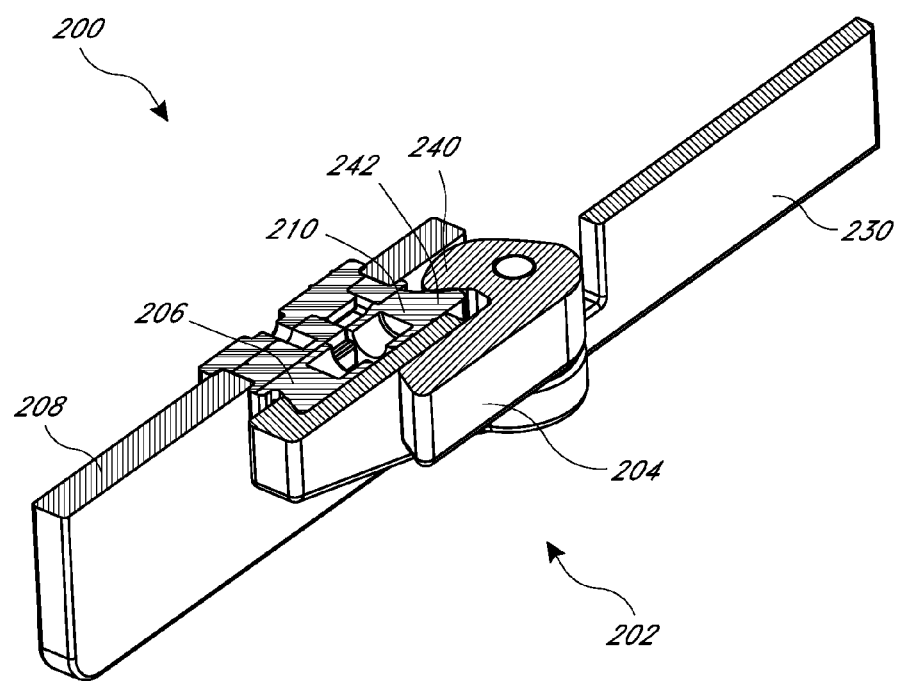
FIG. 17 is a cross-sectional perspective view of the retention assembly shown in FIG. 14 taken along section lines 17-17 of FIG. 14, wherein the coupling mechanism is in an engaged position, according to an embodiment.

For example, FIG. 17 illustrates a cross-sectional perspective view of the retention assembly 200 in which the coupling mechanism 202 is in an engaged position. Similar to the embodiment discussed above, the locking mechanism 204 can comprise a locking tab 240 configured to engage with an interlocking portion 242 of the engagement protrusion 206. In order to attach the coupling mechanism 202 onto the protrusion 206, the engagement protrusion 206 is initially inserted into an engagement cavity of the housing 230 with the lever mechanism 204 in an open position (not shown). Thereafter, the lever mechanism 204 is rotated to be closed position (as shown in FIG. 17) and the locking tab 240 contacts the interlocking portion 242 in order to urge the interlocking portion 242 into a collapsed position such that the lever mechanism 204 can rotate towards the close position.

Figure 19:
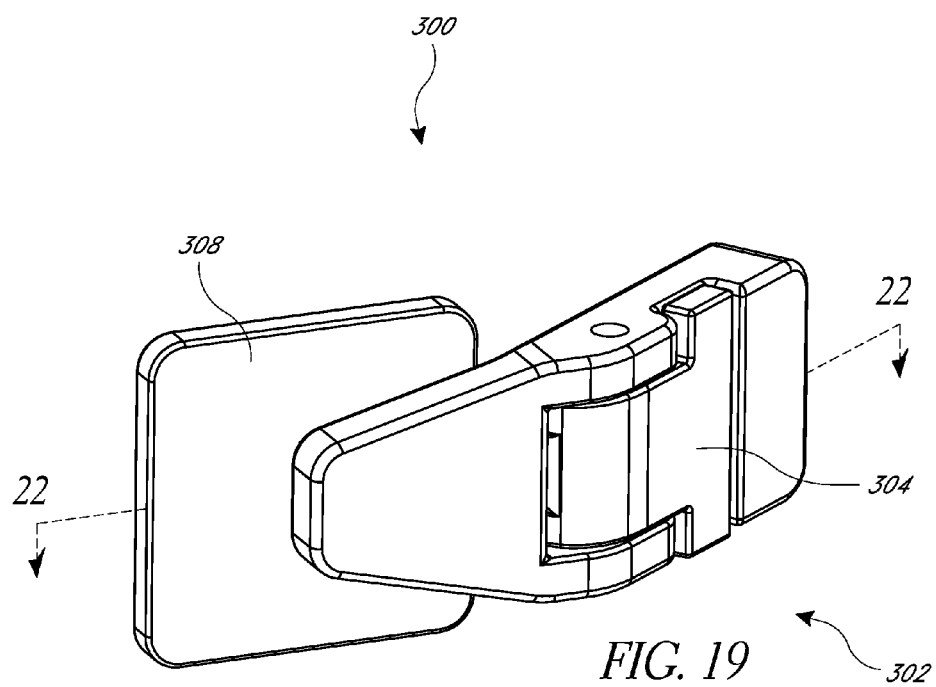
FIG. 19 is a perspective view of another embodiment of a retention assembly.
Figure 20A:
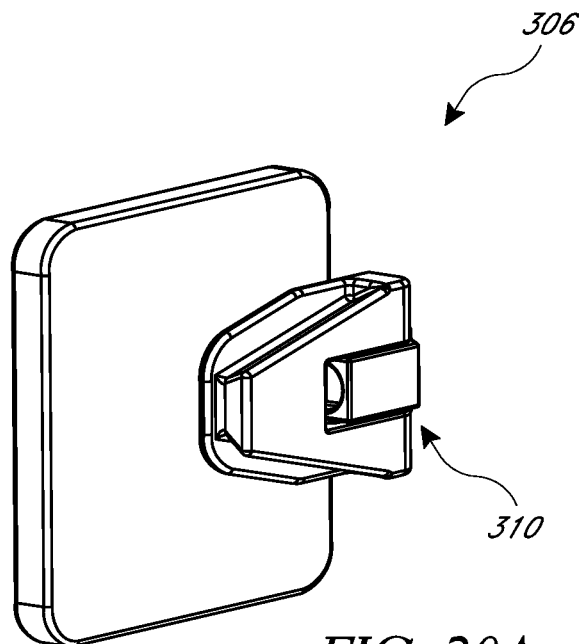
FIGS. 20A-B are perspective and side views of an engagement protrusion of the retention assembly of FIG. 19, according to an embodiment.
Figure 20B:
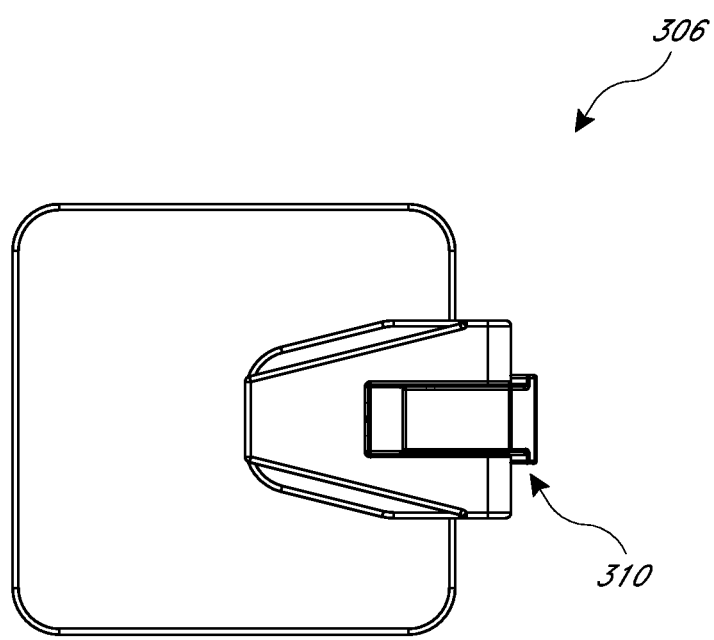
Figure 21A:
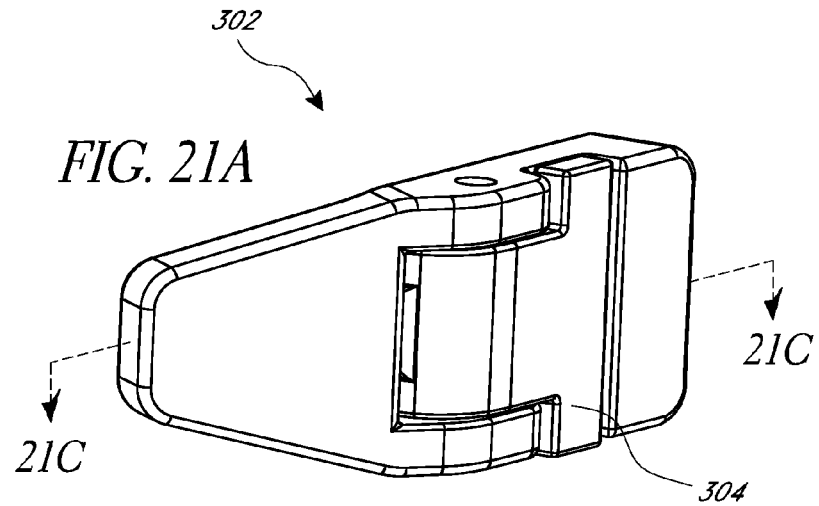
FIGS. 21A-C are front and rear perspective and cross-sectional views of a coupling mechanism of the retention assembly of FIG. 19, according to an embodiment.
Figure 21B:
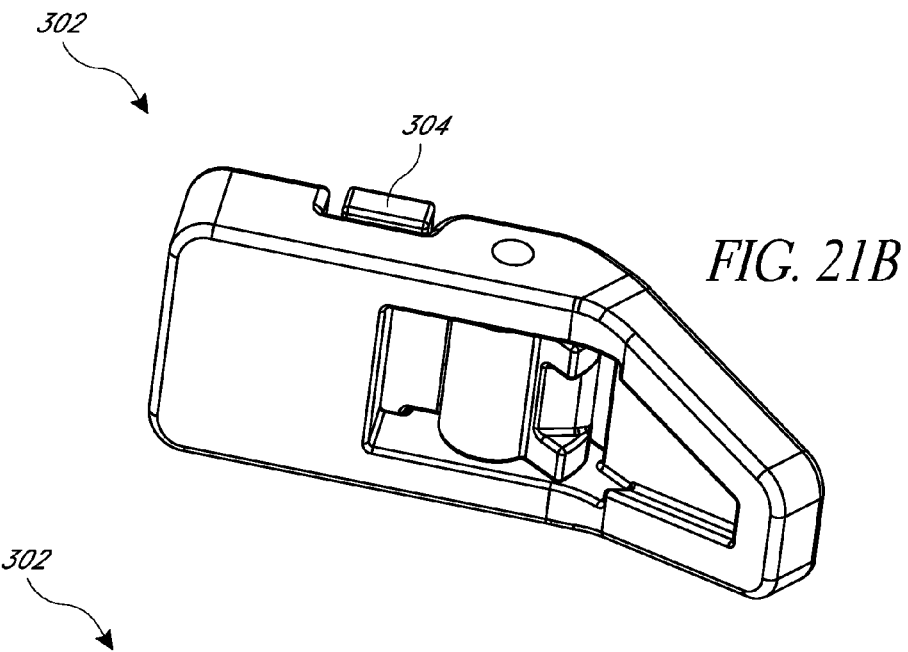
Figure 21C:
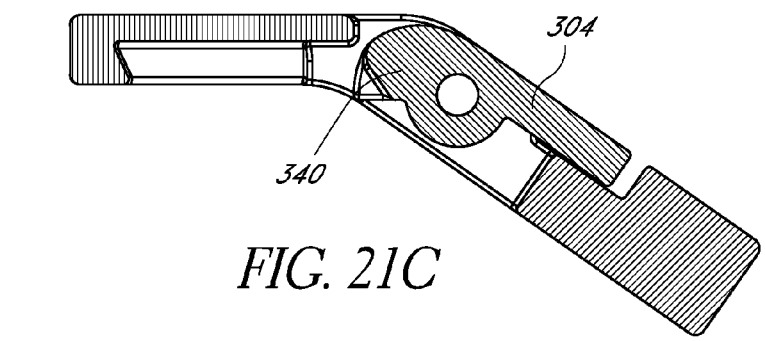
Figure 22:
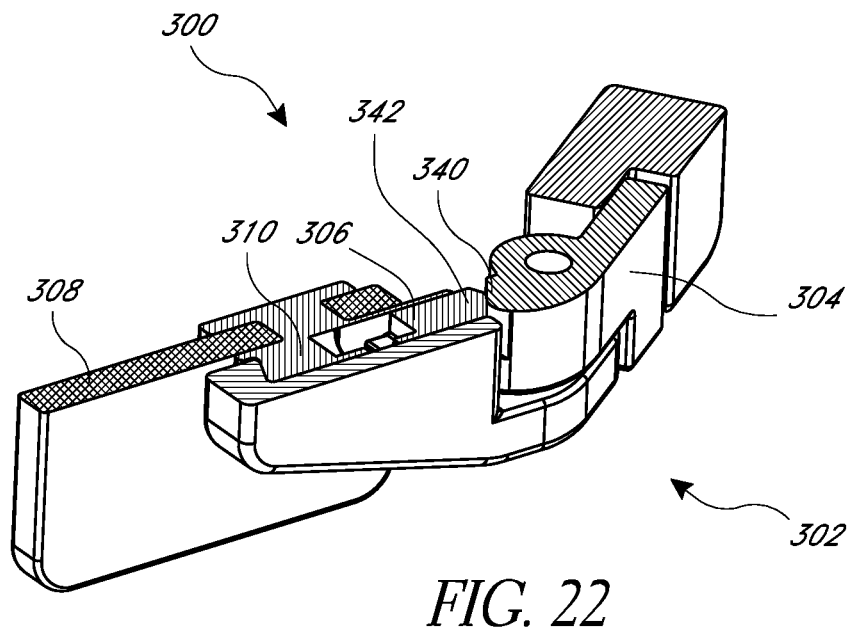
FIG. 22 is a cross-sectional perspective view of the retention assembly shown in FIG. 19 taken along section lines 22-22 of FIG. 19, wherein the coupling mechanism is in an engaged position, according to an embodiment.
Figure 23:
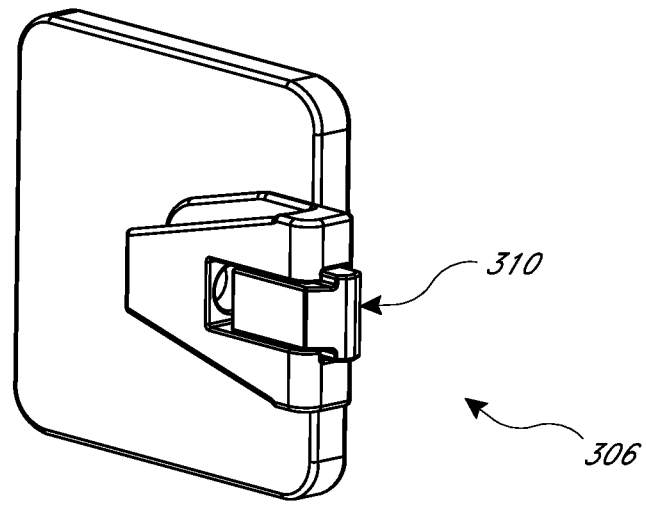
FIG. 23 is a perspective view of the engagement protrusion and biasing mechanism of the retention assembly of FIG. 19, according to an embodiment.

FIG. 19 is a perspective view of another embodiment of a retention assembly 300. FIGS. 20A-B are perspective and side views of an engagement protrusion 306 of the retention assembly 300, according to an embodiment. FIGS. 21A-C are front and rear perspective and cross-sectional views of a coupling mechanism 302 of the retention assembly 300, according to an embodiment. FIG. 22 is a cross-sectional perspective view of the retention assembly 300, which illustrates the configuration, interconnection, and movement of the components of the retention assembly 300, according to an embodiment. FIG. 23 is a perspective view of the engagement protrusion 306 and the sliding or locking mechanism 310 of the retention assembly 300, according to an embodiment.

As illustrated, the function and operation of the retention assembly 300 can provide a secure engagement between a lens 308 and the retention assembly 300 in order to securely fasten the earstem relative to the lens 308. Notably, the retention assembly 300 can be actuated by rotating the lever mechanism 304 in opposite directions than required in the retention assembly 200 and the retention assembly 22. Accordingly, in order to move the lever mechanism 304 to the closed position, the lever mechanism 304 would need to be rotated in a posterior direction instead of an anterior direction, as with the assemblies 22, 200. As such, for movement in either direction, embodiments can be provided in which the configuration of the lever mechanism 304 can be modified to allow the locking tab 340 to engage with a corresponding interlocking portion 342 of the engagement protrusion 306. Thus, the retention assembly 300 illustrates that the retention assembly 22 can be modified such that the lever mechanism can be rotated towards a close position by moving the lever mechanism in either an anterior direction or a posterior direction, as desired to be designed.

The retention assembly 300 also illustrates the concept of incorporating a sliding or locking mechanism 310 into the engagement protrusion 306, thereby separating rotational and sliding movements to separate components instead of a single component as discussed above with respect to the retention assembly 22. However, sliding and rotational movement need not be required in some embodiments. Thus, in embodiments were only rotational movement is provided, the lever mechanism can comprise a resilient material that allows the locking tab to deflect during rotation and engage with the engagement protrusion once the lever mechanism is in the closed position. Further, other embodiments can be provided in which the lever mechanism only slides in order to engage with the engagement protrusion.

Figure 24:
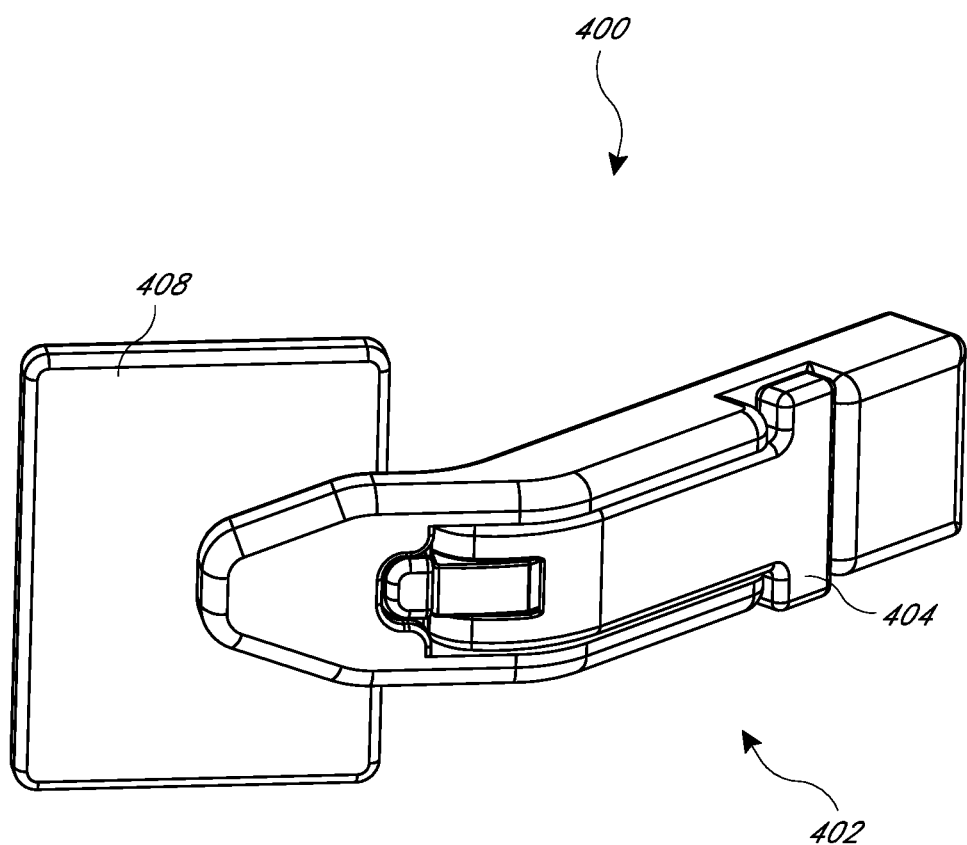
FIG. 24 is a perspective view of yet another embodiment of a retention assembly.
Figure 25A:
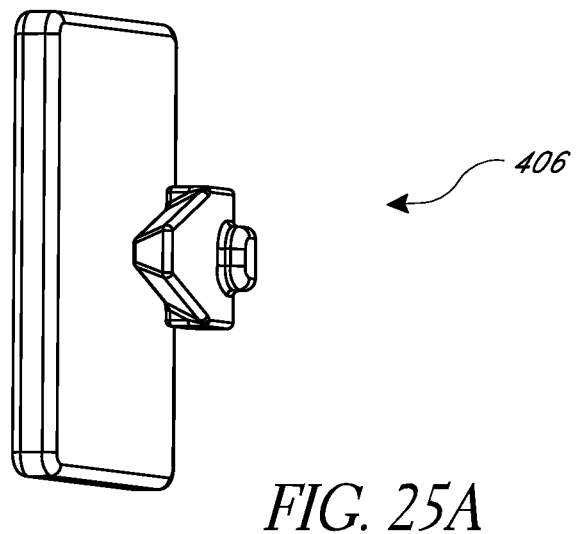
FIGS. 25A-B are perspective and side views of an engagement protrusion of the retention assembly of FIG. 24, according to an embodiment.
Figure 25B:
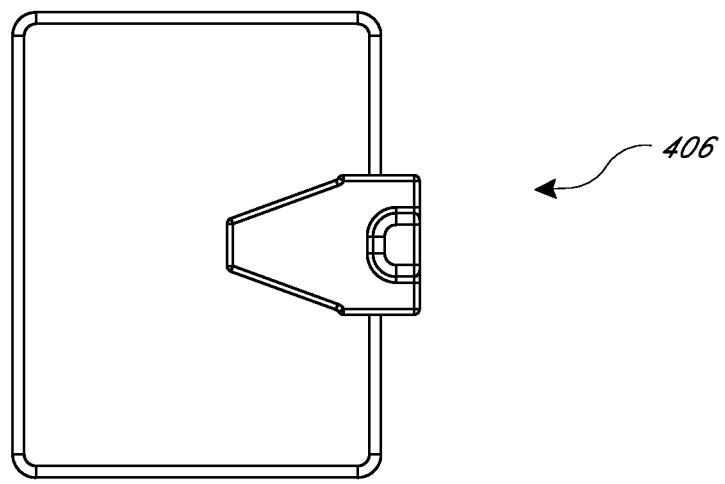
Figure 26A:
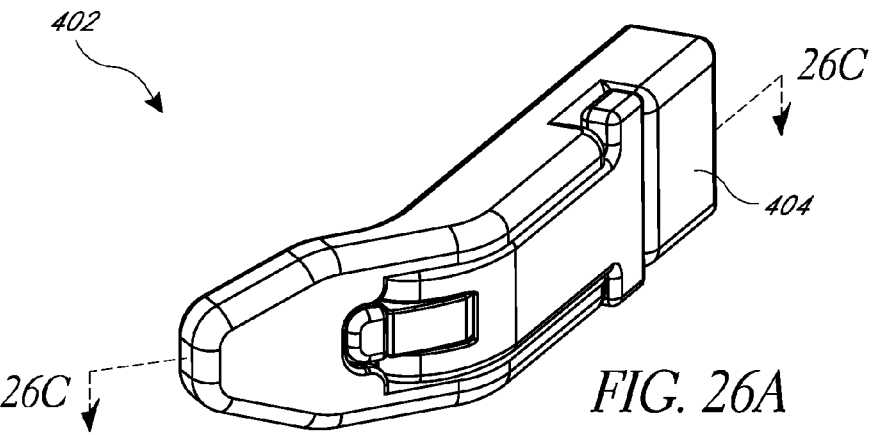
FIGS. 26A-C are front and rear perspective and cross-sectional views of a coupling mechanism of the retention assembly of FIG. 24, according to an embodiment.
Figure 26B:
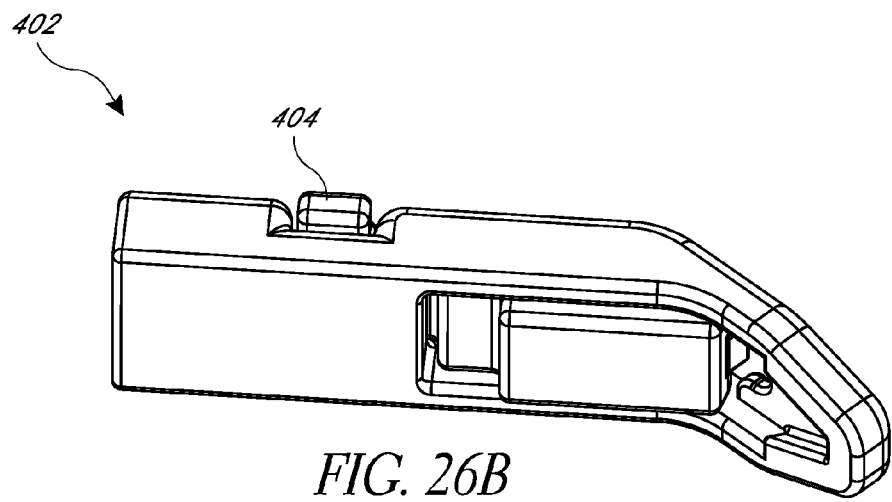
Figure 26C:
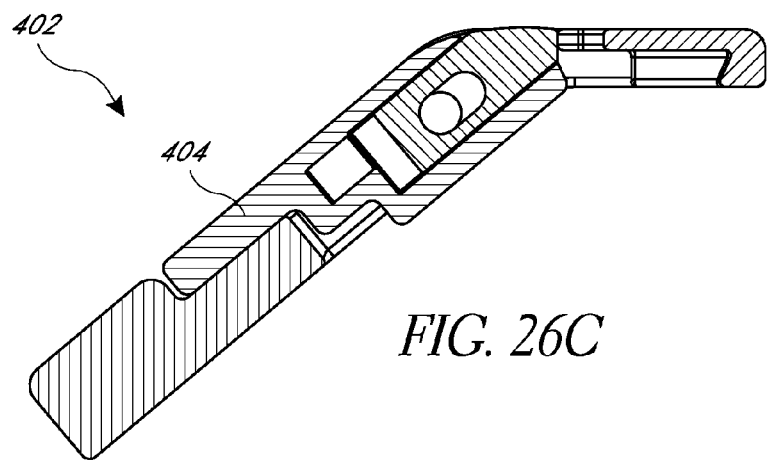

Yet another embodiment of a retention assembly is illustrated in FIGS. 24-28B. FIG. 24 is a perspective view of a retention assembly 400. FIGS. 25-B are perspective and side views of an engagement protrusion 406 of the retention assembly 400, according to an embodiment. FIGS. 26-C are front and rear perspective and cross-sectional views of a coupling mechanism 402 of the retention assembly 400, according to an embodiment. FIG. 27 is a cross-sectional perspective view of the retention assembly 400 in which the coupling mechanism 402 is in an engaged position, according to an embodiment. FIG. 28A-B are perspective and perspective cross-sectional views of the lever mechanism 404 and sliding mechanism 410 of the retention assembly 400, according to an embodiment.

The retention assembly 400 can be configured such that a biasing mechanism is incorporated into the lever mechanism 404. Accordingly, a locking function can be performed by a slidable and/or biased structure disposed on or inside the lever mechanism 404 which can engage or disengage with an engagement protrusion 406 of the retention assembly 400. FIGS. 28A-B illustrate a lever mechanism 404 which incorporates a sliding mechanism 410. The sliding mechanism 410 can comprise a biasing mechanism and a locking structure 412 that can be urged into engagement with the engagement protrusion 406 of the retention assembly 400.

Accordingly, the retention assembly 400 illustrates that in some embodiments, the lever mechanism 404 can be rotated between closed and open positions with a sliding mechanism 410 incorporated into the lever mechanism to facilitate engagement of the lever mechanism with the engagement protrusion.

Various embodiments can be provided in which the lever mechanism rotates in an anterior or posterior direction in order to reach the closed position. Further, the retention assembly can comprise one or more sliding or locking mechanisms that can be incorporated into the engagement protrusion, the lever mechanism, and/or the housing of the coupling mechanism. In addition, the engagement between a locking tab of the coupling mechanism and an interlocking portion of an engagement protrusion can be achieved through rotational and/or sliding movement of the locking tab relative to the interlocking portion. In some embodiments, the locking tab can be formed on the lever mechanism and/or on the sliding and locking mechanism.

In some embodiments, the lens retention assembly can provide excellent ballistic resistance for the lens and the earstems of the eyeglass. The retention assembly can be integrated into, carried, or supported by the lens(es) and/or earstems of the eyeglass. One or more components of the retention assembly can also be formed as a separate part that can be retrofitted onto existing eyewear.

Embodiments of the eyeglass disclosed herein can tend to ensure that the lens does not become transitorily and/or permanently substantially separated from the earstems in response to a ballistic event. Further, embodiments of the eyeglass can be configured such that a force transmitted to the lens is also generally transmitted to the earstems of the eyeglass while substantially maintaining engagement between the lens and the earstems. For example, although the lens of such an eyeglass may be damaged (cracked or chipped), the lens avoids separating relative to the earstems. This ballistic resistance can provide excellent protection to the wearer.

Additionally, the lens retention assembly can comprise a resilient material, such as a compressible or flexible material disposed at least along a portion of the lens retention assembly. For example, a protrusion, connector, body, or other structure or component of the lens retention assembly can be formed from or otherwise include one or more resilient materials. As a result, a ballistic event will not tend to result in damage at the interconnection between the lens retention assembly and the lens(es) and/or earstems. In some embodiments, a protrusion of the lens retention assembly can be formed from a resilient or flexible material or comprise a coating, layer, or one or more surface features formed from the resilient or flexible material. The lens retention assembly, such as the projection and/or the resilient or flexible material, can have a modulus of elasticity that is less than that of the lens. Further, lens retention assembly, such as the projection and/or the resilient or flexible material, can have a modulus of elasticity that is less than that of the earstems. Accordingly, at least a portion of the lens retention assembly can dampen or absorb force or vibration from a ballistic event.

In some embodiments that comprise a unitary lens, the lens can be engaged and/or supported at both lateral sides. For example, a unitary lens may be secured to and/or supported by a frame using a first retention assembly on the left side of midline and a second retention assembly on the right side of midline. The retention assemblies can include any of the passive or active retention mechanisms disclosed herein. The first retention assembly may be positioned on a point that is within the left lateral one third of the length of the lens, measured hinge to hinge. The second retention assembly may be positioned on a point that is within the right lateral one third of the lens. Typically, the retention assemblies can be symmetrically spaced apart along the length of the lens, or as a mirror image across the plane of symmetry (anatomical midline).

Although embodiments of these inventions have been disclosed in the context of certain examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Any embodiment can contain one or more features of any of the disclosed embodiments.

What is claimed is:

1. Eyewear comprising:
    at least one lens;
    at least one earstem;
    a retention assembly comprising an engagement protrusion attached to the lens and a coupling mechanism attached to an end of the earstem, the engagement protrusion configured to be fixed relative to the lens, the coupling mechanism comprising:
        a housing configured to receive the engagement protrusion;
        a lever mechanism being operative to move between open and closed positions for disengaging or engaging with the engagement protrusion; and
        a biasing mechanism configured to urge the lever mechanism at least into a closed position.

2. The eyewear of claim 1, wherein the engagement protrusion comprises an interlocking portion configured to interconnect with a corresponding engagement portion of the lever mechanism when the lever mechanism is in the closed position to securely mount the earstem relative to the lens.

3. The eyewear of claim 2, wherein the engagement portion of the lever mechanism is configured to slide over the interlocking portion and rotate to the closed position to securely mount the earstem relative to the lens.

4. The eyewear of claim 1, wherein the lever mechanism is rotatably mounted relative to the housing to allow the lever mechanism to move between open and closed positions for disengaging or engaging with the engagement protrusion.

5. The eyewear of claim 4, wherein the lever mechanism is rotatably and slidably mounted relative to the housing to allow the lever mechanism to move between open and closed positions for disengaging or engaging with the engagement protrusion.

6. The eyewear of claim 5, wherein the coupling mechanism further comprises an interconnecting block disposed within the housing and rotatably coupled to both the lever mechanism and housing, wherein the interconnecting block is configured to move between an extended position and a contracted position to provide a linear sliding movement of the lever mechanism.

7. The eyewear of claim 4, wherein the lever mechanism comprises a sliding mechanism, wherein the sliding mechanism comprises the biasing mechanism and a locking structure configured to be engaged with the engagement protrusion.

8. The eyewear of claim 1, wherein the lever mechanism is moveable from the open position towards the closed position in an anterior direction.

9. The eyewear of claim 1, wherein the eyewear is configured to be frameless.

10. Eyewear comprising:
   at least one lens;
   at least one earstem;
   a retention assembly configured to releasably secure the lens relative to the earstem comprising an engagement protrusion attached to the lens and a coupling mechanism attached to an end of the earstem, the engagement protrusion being fixed relative to the lens, the coupling mechanism comprising:
   a housing configured to receive the engagement protrusion;
   a lever mechanism configured to rotate about a fixed axis of rotation between open and closed positions for disengaging or engaging with the engagement protrusion; and
   a biasing mechanism configured to urge the lever mechanism at least into a closed position.

11. The eyewear of claim 10, wherein the lever mechanism is rotatable from the open position towards the closed position in an anterior direction.

12. The eyewear of claim 10, wherein the engagement protrusion comprises an interlocking portion configured to interconnect with a corresponding engagement portion of the lever mechanism when the lever mechanism is in the closed position to securely mount the earstem relative to the lens.

13. The eyewear of claim 12, wherein the engagement portion of the lever mechanism is configured to slide over the interlocking portion and rotate to the closed position to securely mount the earstem relative to the lens.

14. The eyewear of claim 10, wherein the lever mechanism comprises a locking tab and a resilient material, wherein the resilient material allows the locking tab to deflect during rotation and engage with the engagement protrusion when the lever mechanism is in the closed position.

15. The eyewear of claim 10, wherein the engagement protrusion comprises a wedge shape and an opening of the housing is configured to receive the engagement protrusion.

16. The eyewear of claim 10, wherein the eyewear is configured to be frameless.

* * * * *